(12) United States Patent
Moon et al.

(10) Patent No.: US 6,261,198 B1
(45) Date of Patent: Jul. 17, 2001

(54) CONTINUOUSLY VARIABLE TRANSMISSION

(75) Inventors: Byung Il Moon, Seoul; Wan Moo Yoo; Hyo Keun Oh, both of Kyungki-do; We Chool Ra, Seoul, all of (KR)

(73) Assignee: Aprotech Co., Ltd., Seoul (KR)

( * ) Notice: Subject to any disclaimer, the term of this patent is extended or adjusted under 35 U.S.C. 154(b) by 0 days.

(21) Appl. No.: 09/308,317

(22) PCT Filed: Nov. 20, 1997

(86) PCT No.: PCT/KR97/00227

§ 371 Date: Jan. 31, 2000

§ 102(e) Date: Jan. 31, 2000

(87) PCT Pub. No.: WO98/22733

PCT Pub. Date: May 28, 1998

(30) Foreign Application Priority Data

Nov. 20, 1996 (KR) ................................. 96-56980

(51) Int. Cl.⁷ ................................ F16H 47/08; F16H 3/72
(52) U.S. Cl. .................................................... 475/36
(58) Field of Search ........................................ 475/36, 53

(56) References Cited

U.S. PATENT DOCUMENTS

| | | | |
|---|---|---|---|
| 4,779,487 | * 10/1988 | Ptisch et al. ............................ | 475/36 |
| 4,932,928 | 6/1990 | Crockett . | |
| 5,030,178 | * 7/1991 | Ming-luen ............................. | 475/36 |
| 5,415,597 | 5/1995 | Ra et al. . | |

FOREIGN PATENT DOCUMENTS

| | | |
|---|---|---|
| 9-166197 | 6/1997 | (JP) . |
| 95/01522 | 1/1995 | (WO) . |

* cited by examiner

*Primary Examiner*—Dirk Wright
(74) *Attorney, Agent, or Firm*—McDermott, Will & Emery

(57) ABSTRACT

The present invention relates to a continuously variable transmission constructed in such a way that it can speed-change the power inputted to an input shaft according to the load applied to an output shaft and transmit the power to the output shaft even though all the gears remain engaged, and in addition reverse operation can also be effectuated in a simple way.

Reviewing the construction thereof, it is mainly composed of a speed change system, which receives power generated by an engine, changes speed and transmits it to the output shaft, a speed change controlling system which automatically adjusts the rotational ratio to correspond to the condition of the load on the output shaft, and a reverse rotation system.

The present invention, comprises two (compund) gear sets in which each same element is removed from two planet gear sets; and a reverse rotation system, and the power inputted through an input element selected from the two gear sets is changed into the required speed and transmitted to the output shaft.

Reviewing the operational characteristics, the present invention is constructed in such a way that the decelerated rotation smaller than the input rotation is transmitted to the impeller by utilizing an direct clutch. Therefore, it is a characteristic of the present invention that the rotational force transmitted to the impeller is alway larger than the input torque.

In view of the effects, the present invention can obtain a large propulsion force, preferable performance, smooth and quiet operation, and can speed-change steplessly at the time of reverse operation.

16 Claims, 15 Drawing Sheets

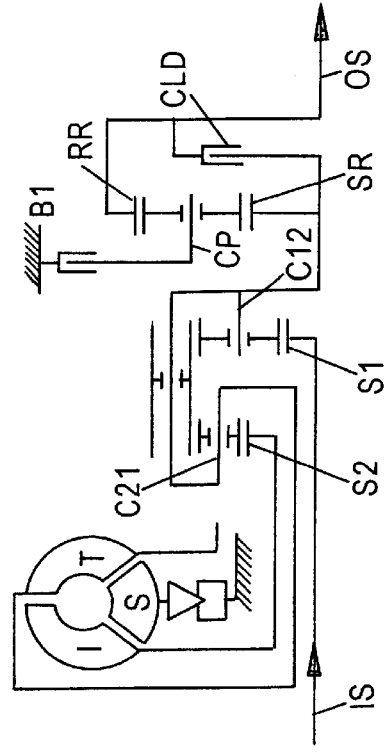
FIG. 14A
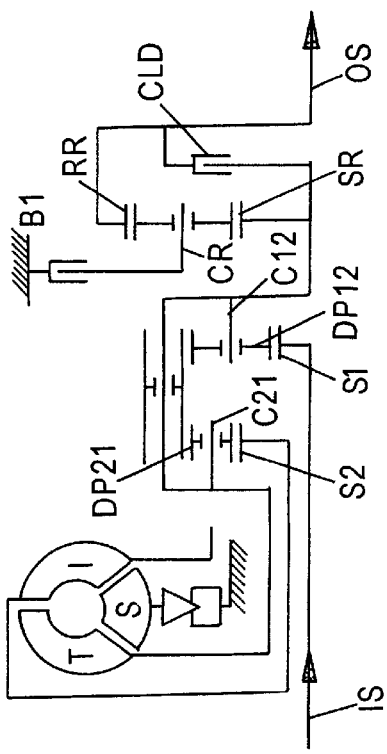
FIG. 14
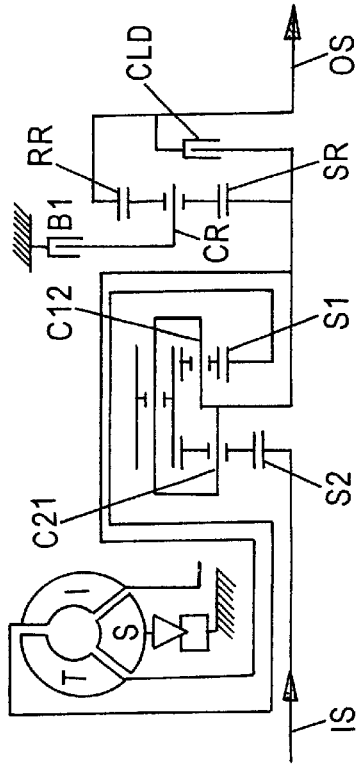
FIG. 14C
FIG. 14B

CONTINUOUSLY VARIABLE TRANSMISSION

TECHNICAL FIELD

The present invention relates to a continuously variable transmission, and more particularly, to a continuously variable transmission constructed in such a way that power input to an input shaft can be transmitted to an output shaft according to the status of a load applied to the output shaft without disengaging or changing gears when changing speed under the state in which all the gears are engaged, and that a reverse rotation driving can also be performed steplessly or at a fixed ratio in a simple manner.

BACKGROUND ART

Generally, in a transmission, speed change is done by selecting one of a number of predetermined gear ratios and at the time of effecting a speed change, there is the nuisance of carefully disengaging and changing gears. Conventional automatic transmissions are of a belt type which have a very complicated structure, are expensive to manufacture and cannot be widely used since they have a limited range of capacity because of wear, noise and slippage.

DISCLOSURE OF INVENTION

The present invention was made in view of the problems as described above, therefore, an object of the present invention is to provide a continuously variable transmission which does not use the complicated mechanism, responds quickly to a change in load, transmits the rotational force smoothly, changes the speed steplessly at forward rotation and reverse rotation by simple construction, reduces manufacturing cost, and provides an improved durability.

To achieve these and other objects, the present invention comprises a speed change system which receives power generated by an engine, changes the speed and transmits it to the output shaft, a speed change controlling system which can automatically control the ratio of rotation which corresponds to the load condition of the output shaft, and various 4 type reverse rotation systems, and especially the reverse rotation driving can be performed steplessly.

Summarizing the construction of the speed change system, the speed change controlling system and the reverse rotation system, the main characteristics of the speed change system is that it utilizes a compound planet gear unit that is, has 2 gear sets in which each same element (sun gear or ring gear) is removed from 2 planet gear sets (each including a sun gear, a carrier, and a ring gear), and transmits to the output shaft the power inputted through an appropriate combinational connection between the constitutional elements of gear set and at the same time through the input element(s) selected from 2 gear sets.

The speed change controlling system utilizes an improved torque converter which is improved over the torque converter of known automatic transmissions. Reviewing the construction of the speed change controlling system utilizing the terminologies related to the constitutional parts used in the conventional torque converter, for the convenience of explanation, the speed change controlling system comprises an impeller which is a driving body, a turbine which is a driven body, a stator for torque-increasing, a connecting shaft to be connected to the speed change system, a control shaft, and a fixed shaft for fixing the stator.

A reverse rotation system has a planet gear set (sun gear, ring gear, carrier) and a brake, and is constructed to accomplish the reverse rotation steplessly with an appropriate combinational connection between each constitutional element of the gear set and the speed change system.

The clutch and brake applied to the system of the present invention can utilize multi-disk wet-type clutch and brake of the known automatic transmission, and the brake can utilize a band brake, however, the clutch and brake are not limited to them.

BRIEF DESCRIPTION OF THE DRAWINGS

For a fuller understanding of the nature and objects of the invention, reference should be had to the following detailed description taken in conjunction with the accompanying drawings in which:

FIG. 1 is a schematic drawing of the continuously variable transmission of the present invention that is capable of operating in the reverse rotation I state;

FIG. 2 is a schematic drawing of the continuously variable transmission of the present invention that is capable of operating in the reverse rotation II state;

FIG. 3 is a schematic drawing of the continuously variable transmission of the present invention that is capable of operating in the reverse rotation III state;

FIG. 4 is a schematic drawing of the continuously variable transmission of the present invention that is capable of operating in the reverse rotation IV state;

FIG. 5 is an operational view showing a state in which the continuously variable transmission of the present invention idles in neutral state;

FIG. 6 is an operational view showing forward rotation state in the continuously variable transmission of the present invention;

FIG. 7 is an operational view showing reverse rotation I state in the continuously variable transmission of the present invention;

FIG. 8 is an operational view showing reverse rotation II state in the continuously variable transmission of the present invention;

FIG. 9 is an operational view showing reverse rotation III state in the continuously variable transmission of the present invention;

FIG. 10 is an operational view showing reverse rotation IV state in the continuously variable transmission of the present invention;

Similar reference characters refer to similar parts throughout the several views of the drawings.

BEST MODES FOR CARRYING OUT THE INVENTION

A description of the continuously variable transmission comprising the speed change controlling system and the speed change system of various embodiments to which the speed change controlling system is connected, follows. That is, the speed change system can have various constructions, and stepless speed change can be effectuated by approprietly connecting the speed change controlling system to the speed change system of various embodiments.

First of all, the first embodiment 100 of the present invention composed of a speed change controlling system 10

, a speed change system 110 and a reverse rotation system RI–RIV connected thereto is described in detail with reference to the accompanying drawings.

Speed Change Controlling System 10

The speed change controlling system 10 utilizes a conventional torque converter of an automatic transmission which is a well known apparatus. In the conventional automatic transmission, the power generated by the engine is transmitted as a driving force to the input shaft of the transmission via the torque converter, while in the present invention, the power generated by the engine is directly transmitted to the input shaft and the rotational force of the input shaft is transmitted to the impeller as a large rotational force due to a reduced rotation in speed through the gear set.

Figure 1:
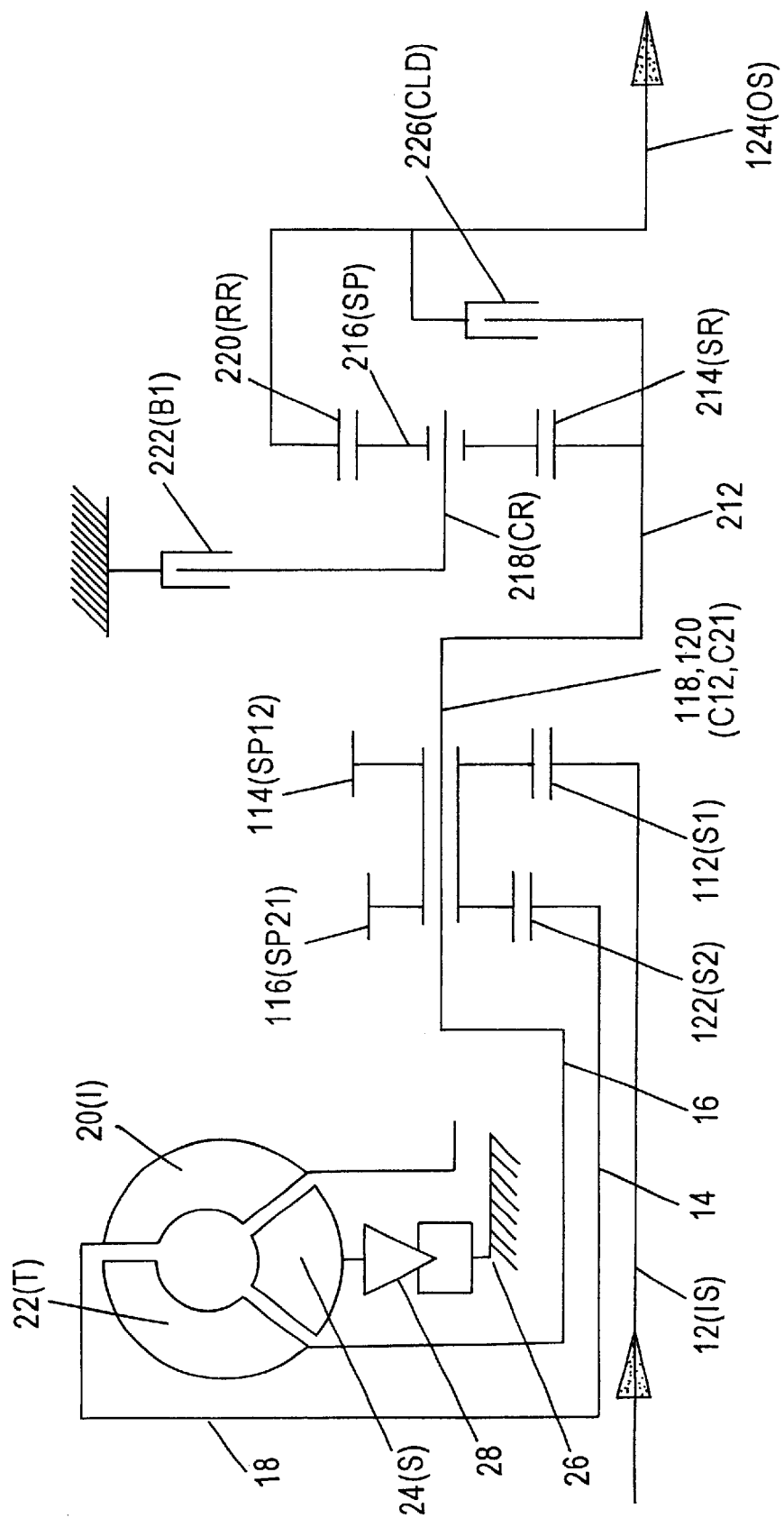
FIG. 1 to FIG. 10 illustrate a first embodiment of a continuously variable transmission of the present invention.

While the torque converter of the conventional automatic transmission has a power transmission function of receiving power generated from the engine and directly transmitting the power to the input shaft of the automatic transmission, the speed change controlling system of the present invention has two roles, one is to control the speed ratio to fit the driving resistance, the other is to transmit the power passed through the speed change controlling system to the output shaft The construction of the speed change controlling system 10 is described below in detail. As shown in FIG. 1, a hollow connecting shaft 14 is coaxially installed on an input shaft 12, and a hollow control shaft 16 is coaxially installed on the connecting shaft 14. An impeller housing 18 is integrally formed with the connecting shaft 14, and an impeller 20 is integrally formed with the impeller housing 18. A turbine 22, facing the impeller 20, is integrated with the control shaft 16, a stator 24 is placed between the impeller 20 and the turbine 22, a hollow fixed shaft 26 is coaxially installed on the control shift 16 inside of the stator 24, and a one-way clutch 28 is inserted between the stator 24 and the fixed shaft 26 to prevent a reverse rotation of the stator 24.

Speed Change System 110

In the speed change system 110 of the first embodiment of the present invention, as shown in FIG. 1, an input sun gear 112 is integrally formed with the input shaft 12 into which the power of the engine is inputted. A first planet gear 114 is meshed with the outside of the input sun gear 112, and a second planet gear 116 is integrally formed with the first planet gear 114. The first planet gear 114 and the second planet gear 116 are installed in output carriers 118, 120 so as to rotate freely. A control sun gear 122 is meshed with the second planet gear 116 and integrally formed with the connecting shaft 14.

On the other hand, an output shaft 124 is coaxially installed with the input shaft 112 and is connected to the output carriers 118, 120 through the direct clutch of the reverse rotation system which is installed between the output carriers 118, 120 and the output shaft 124. The output carriers 118, 120 are integrally connected to the control shaft 16 which is integrally connected to the turbine 22 of the speed change controlling system.

Reverse Rotation System (RI~RIV)

Next, the reverse rotation system in the first embodiment of the present invention is described below.

In the present invention, there are 4 different reverse rotation systems. For reference, the reverse rotation system can be installed on the power line connected to the impeller for a reverse rotation driving of a fixed ratio, however, a description of the construction and operation of such reverse rotation system is omitted.

1. Reverse Rotation System RI

As shown in FIG. 1, the reverse rotation system RI is provided between the output shaft 124 and the output carriers 118, 120 of the speed change system 110. A reverse rotation sun gear shaft 212 is integrally connected to the output carriers 118, 120 of the speed change system 110, and a reverse rotation sun gear 214 is integrally formed with the reverse rotation sun gear shaft 212. A reverse rotation planet gear 216 is meshed with the outside of the reverse rotation sun gear 214 and is installed in a reverse rotation carrier 218 so as to freely rotate. A reverse rotation ring gear 220 is meshed with the outside of the reverse rotation planet gear 216 and is integrally formed with the output shaft 124. A reverse rotation brake 222 is installed at the outside of the reverse rotation carrier 218. A direct clutch 226 is installed between the output shaft 124 and the reverse rotation sun gear shaft 212 so that the output carriers 118, 120 and the output shaft 124 can be connected when the direct clutch 226 is actuated.

A gear unit constituting the present reverse rotation system RI is a single planet gear unit.

2. Reverse Rotation System RII

Figure 2:
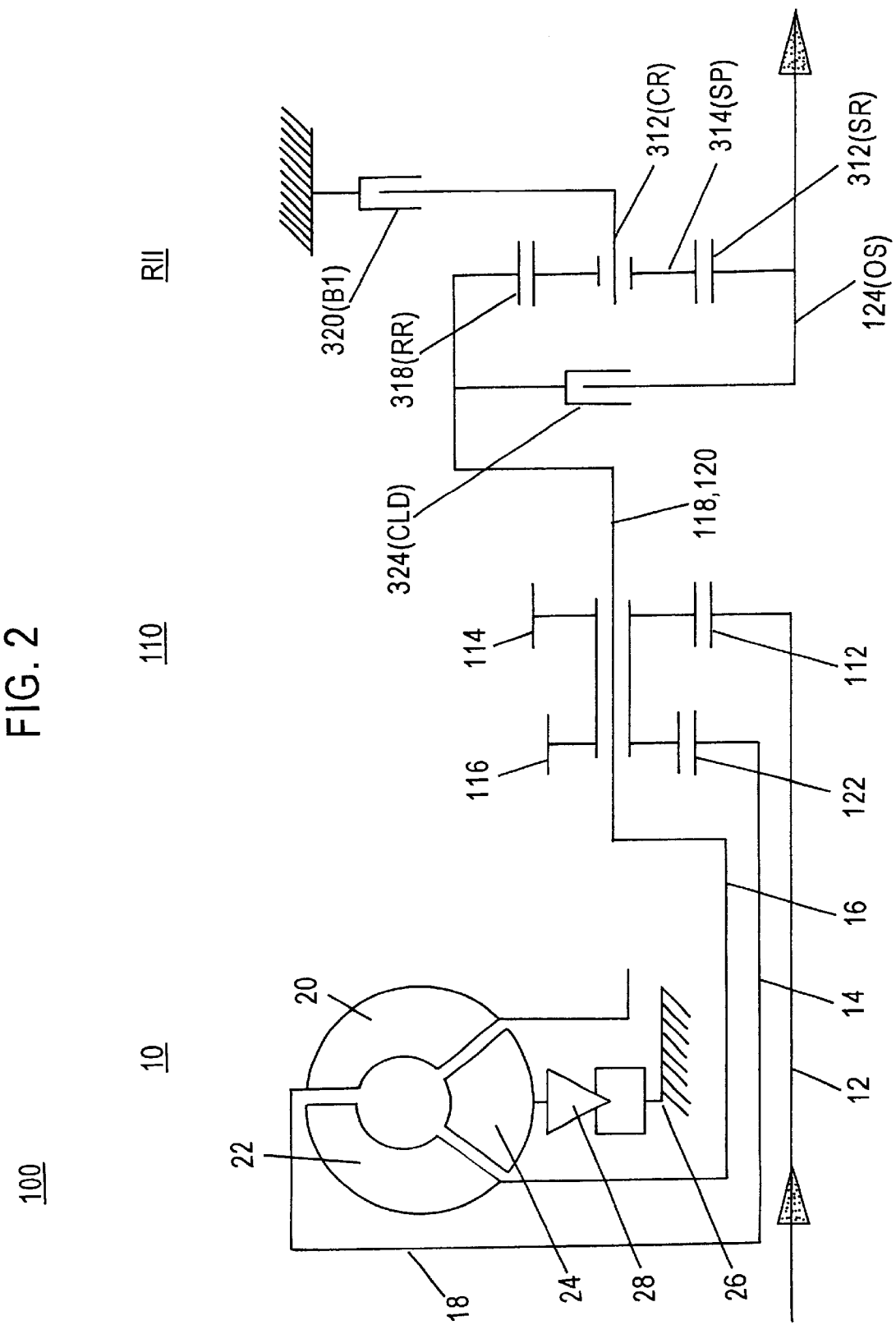

As shown in FIG. 2, the reverse rotation system RII is provided between the output shaft 124 and the output carriers 118, 120 of the speed change system 110. A reverse rotation sun gear 312 is integrally formed with the output shaft 124. A reverse rotation planet gear 314 is meshed with the outside of the reverse rotation sun gear 312 and is installed in a reverse rotation carrier 316 so as to rotate freely. A reverse rotation ring gear 318 is meshed with the outside of the reverse rotation planet gear 314 and is integrally connected the output carriers 118, 120 of the speed change system 110. A reverse rotation brake 320 is installed at the outside of the reverse rotation carrier 316. A direct clutch 324 is installed between the output carriers 118, 120 and output shaft 124 so that the output carriers 118, 120 and the output shaft 124 can be connected when the direct clutch 324 is actuated.

A gear unit constituting the present reverse rotation system RII is a single planet gear unit.

3. Reverse Rotation System RII

Figure 3:
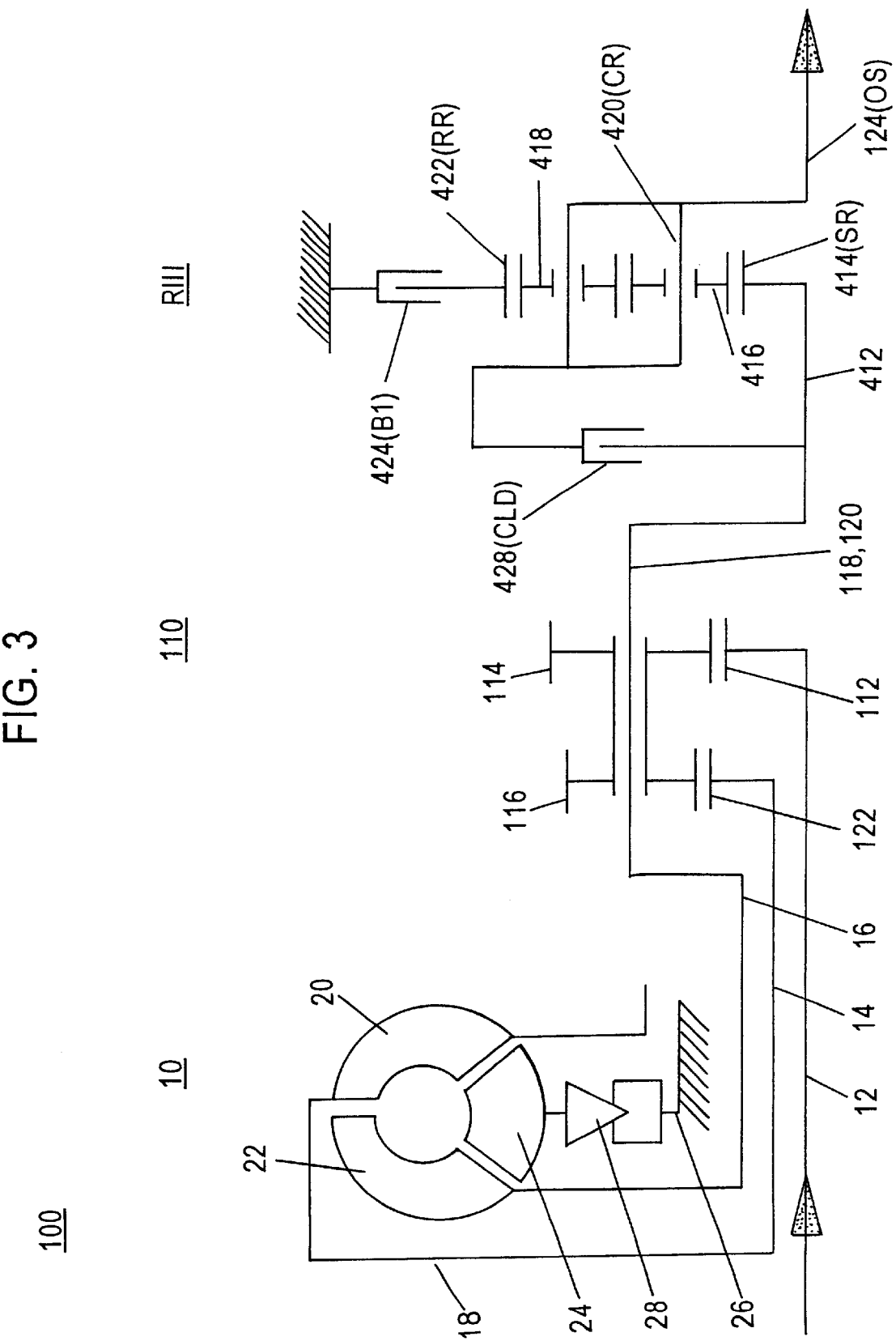

As shown in FIG. 3, the reverse rotation system RII is provided between the output shaft 124 and the output carriers 118, 120 of the speed change system 110. A reverse rotation sun gear shaft 412 is integrally connected to the output carriers 118, 120 of the speed change system 110, and a reverse rotation sun gear 414 is integrally formed with the reverse rotation sun gear shaft 412. A reverse rotation planet gear 416 is meshed with the outside of the reverse rotation sun gear 414, and another reverse rotation planet gear 418 is meshed adjacent to the reverse rotation planet gear 416. These two (dual) reverse rotation planet gears 416, 418 are installed in a reverse rotation carrier 420 so as to freely rotate. The reverse rotation carrier 420 is integrally formed with the output shaft 124. A reverse rotation ring gear 422 is meshed with the outside of the reverse rotation planet gear 418, and a reverse rotation brake 424 is installed at the outside of the reverse rotation ring gear 422. A direct clutch 428 is installed between the reverse rotation sun gear shaft 412 and the reverse rotation carrier 420 so that the output carriers 118, 120 and the output shaft 124 can be connected when the direct clutch 428 is actuated.

A gear unit constituting the present reverse rotation system RIII is a dual planet gear unit.

4. Reverse Rotation System RIV

Figure 4:
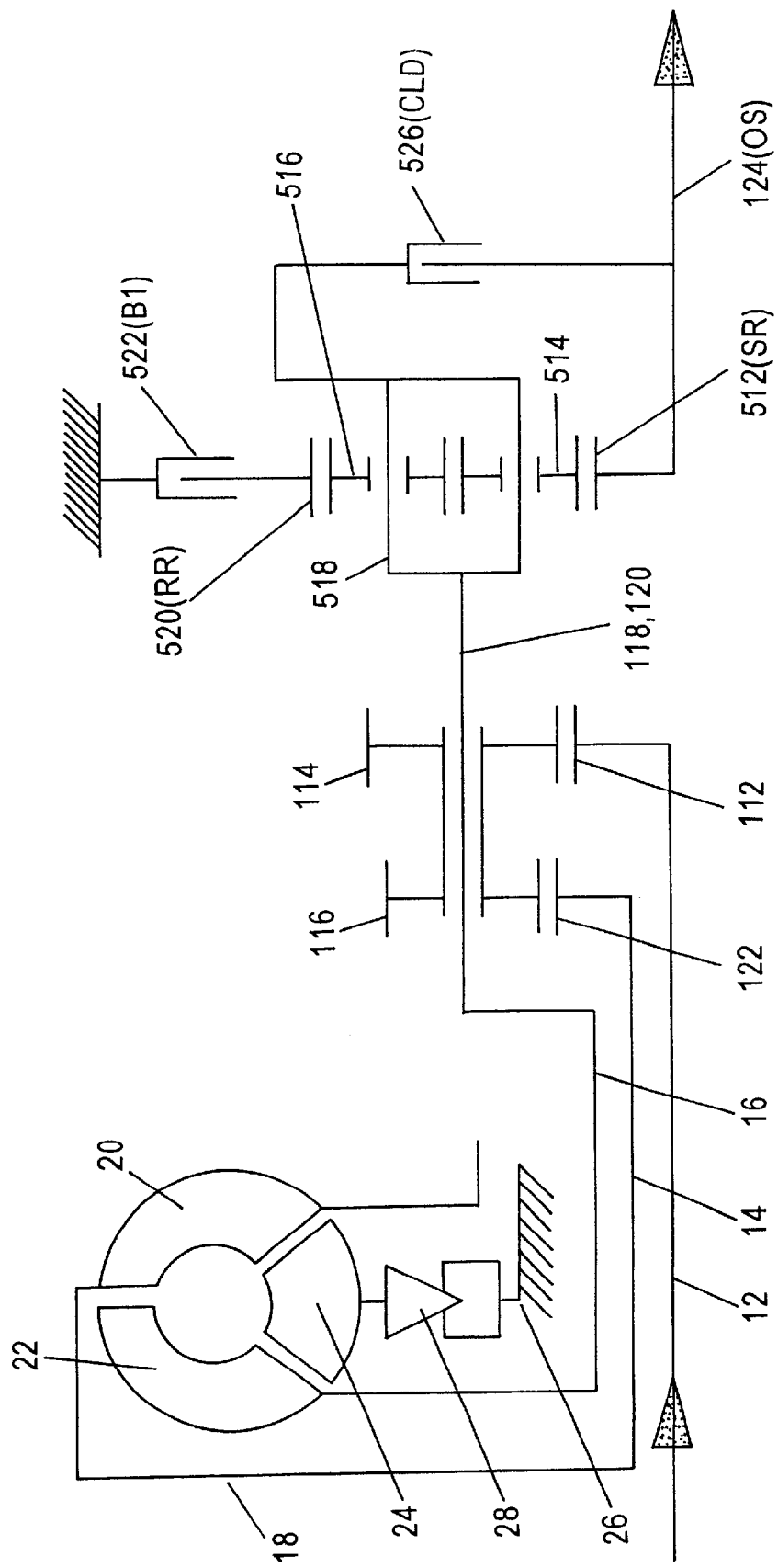

As shown in FIG. 4, the reverse rotation system RIV is provided between the output shaft 124 and the output carriers 118, 120 of the speed change system 110. A reverse rotation sun gear 512 is integrally formed with the output shaft 124. A reverse rotation planet gear 514 is meshed with the outside of the reverse rotation sun gear 512, and another reverse rotation planet gear 516 is meshed adjacent to the reverse rotation planet gear 514. These two (dual) reverse rotation planet gears 514, 516 are installed in a reverse rotation carrier 518 so as to freely rotate, and the reverse rotation carrier 518 is integrally connected to the output carriers 118, 120 of the speed change system 110. A reverse rotation ring gear 520 is meshed with the outside of the reverse rotation planet gear 516, and a reverse rotation brake 522 is installed at the outside of the reverse rotation ring gear 520. A direct clutch 526 is installed between the reverse rotation carrier 518 and the output shaft 124 so that the output carriers 118, 120 and the output shaft 124 can be connected when the direct clutch 526 is actuated.

A gear unit constituting the present reverse rotation system RIV is a dual planet gear unit.

Each direct clutch 226, 324, 428, 526 in the reverse rotation system RI~RIV is provided to make the output carriers 118, 120 and the output shaft 124 connect integrally by it's actuation in the forward rotation state, however, they are not actuated in the reverse rotation state.

The operation methods and the power transmission process according thereto for each speed change stale (neutral, forward and reverse rotation) of the continuously variable transmission of the present invention constructed as described above is described below.

Prior to the explanation, it should be noted that although the continuously variable transmission of the present invention can be used in any mechanism, which speed changes and outputs the driving force, such as motor vehicles and industrial machines, the motor vehicles will be explained as an example herein.

For a purpose of defining terminologies, a rotation of each planet gear means a rotation about its own axis (locking pin, here), and a revolution means the case where the carrier rotates, in which the case normally the planet gear performs a combined rotation and translation.

In addition, for the convenience of explanation, the direction of counterclockwise rotation when viewed from the left side of the drawings is taken as the direction of the input shaft, the direction same as that of the input shaft is defined as direction ↑ (or direction A) in each drawing, similarly the direction opposite to that of the input shaft is defined as direction ↓ (or direction B), the rotation after the stop (acceleration state) is denoted as 0·↑ (or 0·↓), the stop after the rotation (deceleration state) is denoted as ↑·0 (or ↓·0), and the state in which the planet gear does not rotate about its own axis after rotation and all the rotational bodies rotate as an integral body at the same revolutions as the input revolutions is denoted as ↑·1 (or ↓·1).

The operation method for the neutral and forward rotation state is described on the basis of the construction to which the reverse rotation system RI is combined.

I. Neutral State (FIG. 5): Output Shaft 124 Stopped

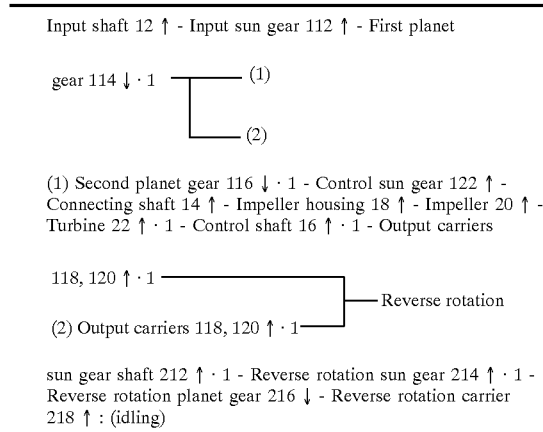

Figure 5:
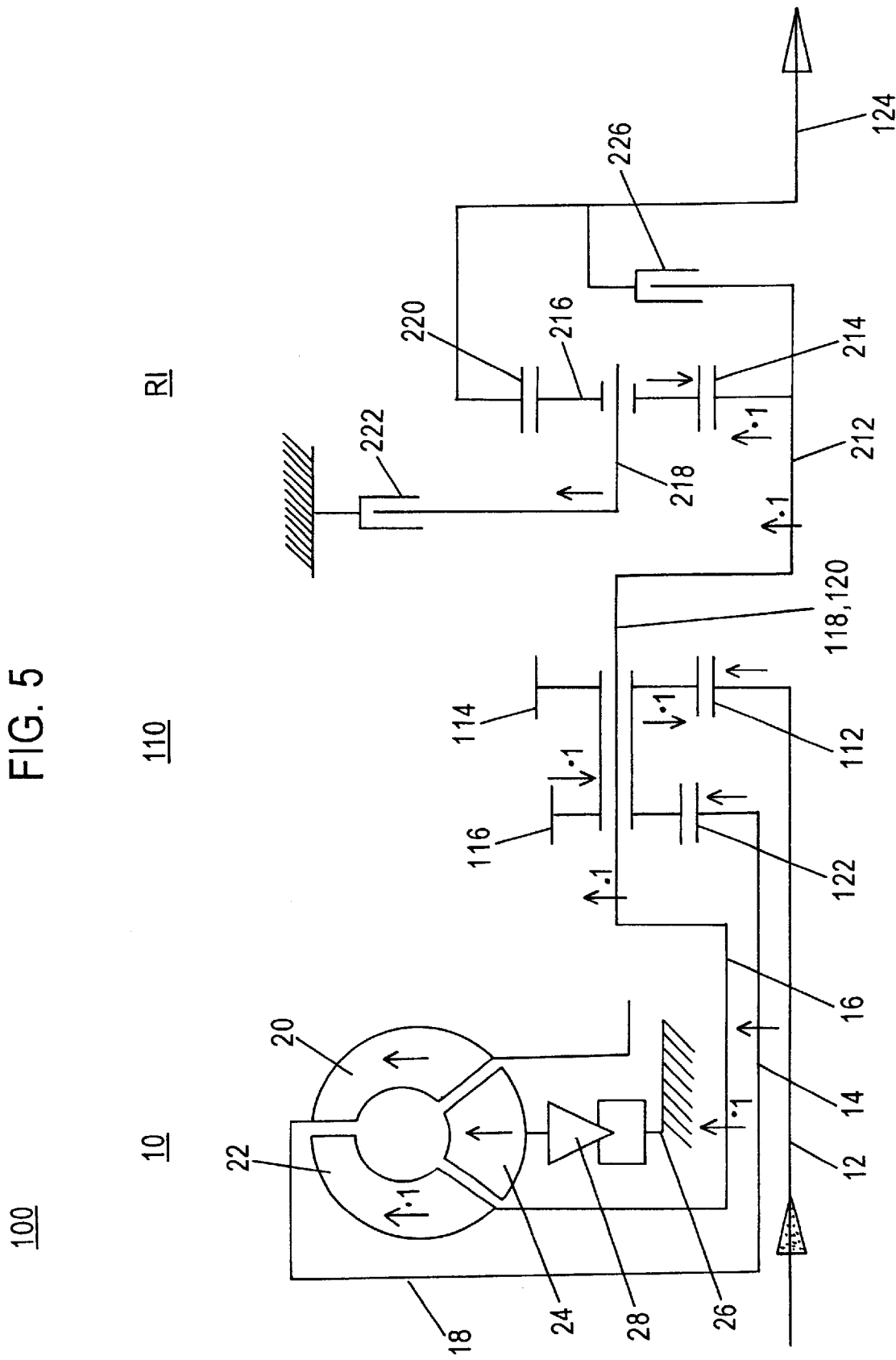

The neutral state is a state in which the direct clutch 226 and the reverse rotation brake 222 are released, the power of the engine can not rotate the output shaft 124, and the system is idling as shown in FIG. 5. That is, if the direct clutch 226 which is installed between the output shaft 124 and the reverse rotation sun gear shaft 212 integral with the output carriers 118, 120 is released, the power between the speed change system 110 and the output shaft 124 is disconnected.

The input shaft 12 rotates upon the input of the power of the engine, the input sun gear 112, integrally formed with the input shaft 12, also rotates in direction A, the same as that of the input shaft 12, and the first planet gear 114, meshed with the input sun gear 112, rotates in direction B, opposite to that of the input sun gear 112. The second planet gear 116, integrally formed with the first planet gear 114, is rotated in direction B, and the control sun gear 122, meshed with the inside of the second planet gear 116, is rotated in direction A, opposite to that of the second planet gear 116. The connecting shaft 14, integrally connected to the control sun gear 122, the impeller housing 18, connected to the connecting shaft 14, and the impeller 20, integral with the impeller housing 18, are rotated in direction A.

The turbine 22 installed to face the impeller 20 is rotated in direction A by the flow of the fluid, the control shaft 16 integrally connected to the turbine 22 is rotated in direction A, and the output carriers 118, 120 integrally connected to the control shaft 16 is rotated in direction A. The reverse rotation sun gear shaft 212 integral with the output carriers 118, 120 is also rotated in direction A, the reverse rotation sun gear 214 integral with the reverse rotation sun gear shaft 212 is rotated in direction A, and rotates the reverse rotation planet gear 216 meshed with the outside of the reverse rotation sun gear 214 in direction B. Since the output ring gear 220 meshed with the outside of the reverse rotation planet gear 216 is stopped by the load of the output shaft 124, the reverse rotation carrier idles in direction A.

Figure 6:
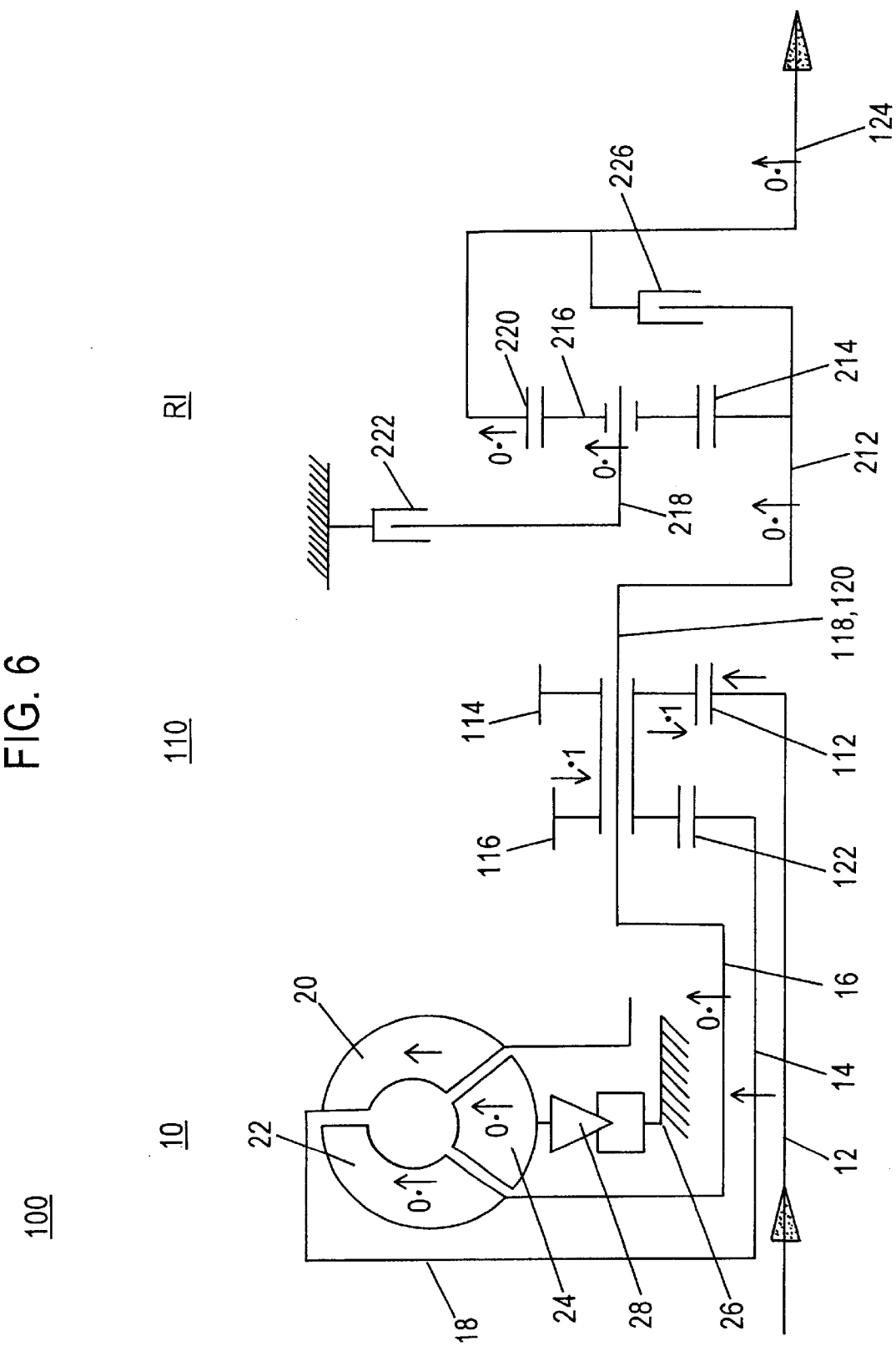

II. Forward Rotation State (FIG. 6)

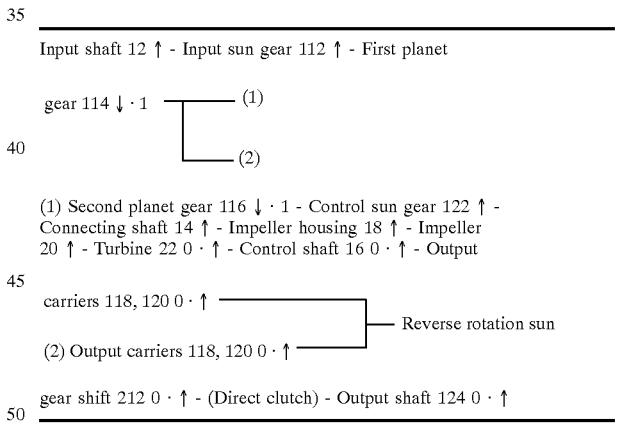

This is a state in which the direct clutch 226 installed between the output shaft 124 and the reverse rotation sun gear shaft 212 integral with the output carriers 118, 120 is actuated. If the power of the engine is inputted to the input shaft 12, the input sun gear 112, integrally formed with the input shaft 12, is rotated in direction A, the same as that of the input shaft 12, the first planet gear 114, meshed with the input sun gear 112, is rotated in direction B opposite to that of the input sun gear 112 since the output carriers 118, 120 are stopped by the load of the output shaft 124 connected through the direct clutch 226. By the rotation of the first planet gear 114, the second planet gear 116, integrally connected to the first planet gear 114, is rotated in direction B and decreases the rotation of the direction A of the control sun gear 122 meshed with the second planet gear 116. The connecting shaft 14, integrally connected to the control sun gear 122, the impeller housing 18, integrally connected to the connecting shaft 14, and the impeller 20, integral with the impeller housing 18, are decelerated and rotated in direction A.

Here, reviewing the procedure of speed changing steplessly from a low step to a high step, under the condition in which the output shaft 124 connected by actuation of the direct clutch 226, the output carriers 118, 120, the control shaft 16 and the turbine 22 are stopped, the rotational force transmitted to the first planet gear 114 through the input sun gear 112 is increased through the second planet gear 116 and transmitted to the control sun gear 122. The increased rotational force is transmitted via the connecting shaft 14, integrally formed with the control sun gear 122, and the impeller housing 18 integrally connected with the connecting shaft 14 to the impeller 20 integral with the impeller housing 18. At this time, since the turbine 22 is stopped by the load of the output shaft 124 due to the actuation of the direct clutch 226, a rotational difference occurs between the impeller and the turbine.

In view of the characteristics of the torque converter, the increased rotational force of the impeller 20 is transmitted to the turbine 22, and the rotational force transmitted to the turbine 22 is transmitted via the control shaft 16 and the output carriers 118, 120 integrally connected to the control shaft to the output shaft 124, and if the resistance acting on the output shaft 124 and the rotational force transmitted to the turbine 22 are in equilibrium, then the output shaft 124 is driven. This is the low speed starting state.

If the rotation of the engine is increased, the rotational difference between the impeller 20 and turbine 22 becomes larger and therefore, the rotational force transmitted to the turbine 22 is increased, and if the rotational force transmitted to the turbine 22 is larger than the resistance acting on the turbine 22 due to the load of the output shaft 124, the output shaft 124 is accelerated until the rotational force of the turbine 22 transmitted from the impeller 20 comes into equilibrium with the resistance acting on the turbine 22.

If the output shaft 124 is accelerated, the load of the output shaft 124 is decreased, therefore, the resistance acting on the turbine 22 is also decreased. If the resistance acting on the turbine 22 is decreased, the rotational difference is decreased between the impeller 20 and the turbine 22 until it comes into equilibrium with this resistance. Therefore, the rotation of the turbine 22 is increased in direction A, the same as that of the impeller 20, and also the rotation of the output carriers 118, 120, connected to the turbine 22, is increased in direction A. The rotation to the output shaft 124 integral with the output carriers 118, 120, is increased and if the load of the output shaft 124 is further reduced due to the increase in rotation of the output shaft 124 and thus the load comes into equilibrium with the driving force of the input shaft 12, the impeller 20 and the turbine 22 are rotated at the ratio of 1:1, and the first planet gear 114 and second planet gear 116 do not rotate about their own axes but all the rotating bodies rotate integrally. This is the high speed state.

In the present embodiment, reviewing the rotational force transmitted to the impeller 20, since the rotational force, increased more than that of the input shaft 12 by the first planet gear 114 and the second planet gear 116, acts on the impeller 20 through the control sun gear 122 and the connecting shaft 14 so as to be transmitted to the turbine 22, the large rotational force is applied to the output shaft 124 at low speed state thereby obtaining excellent acceleration and efficiency.

Figure 7:
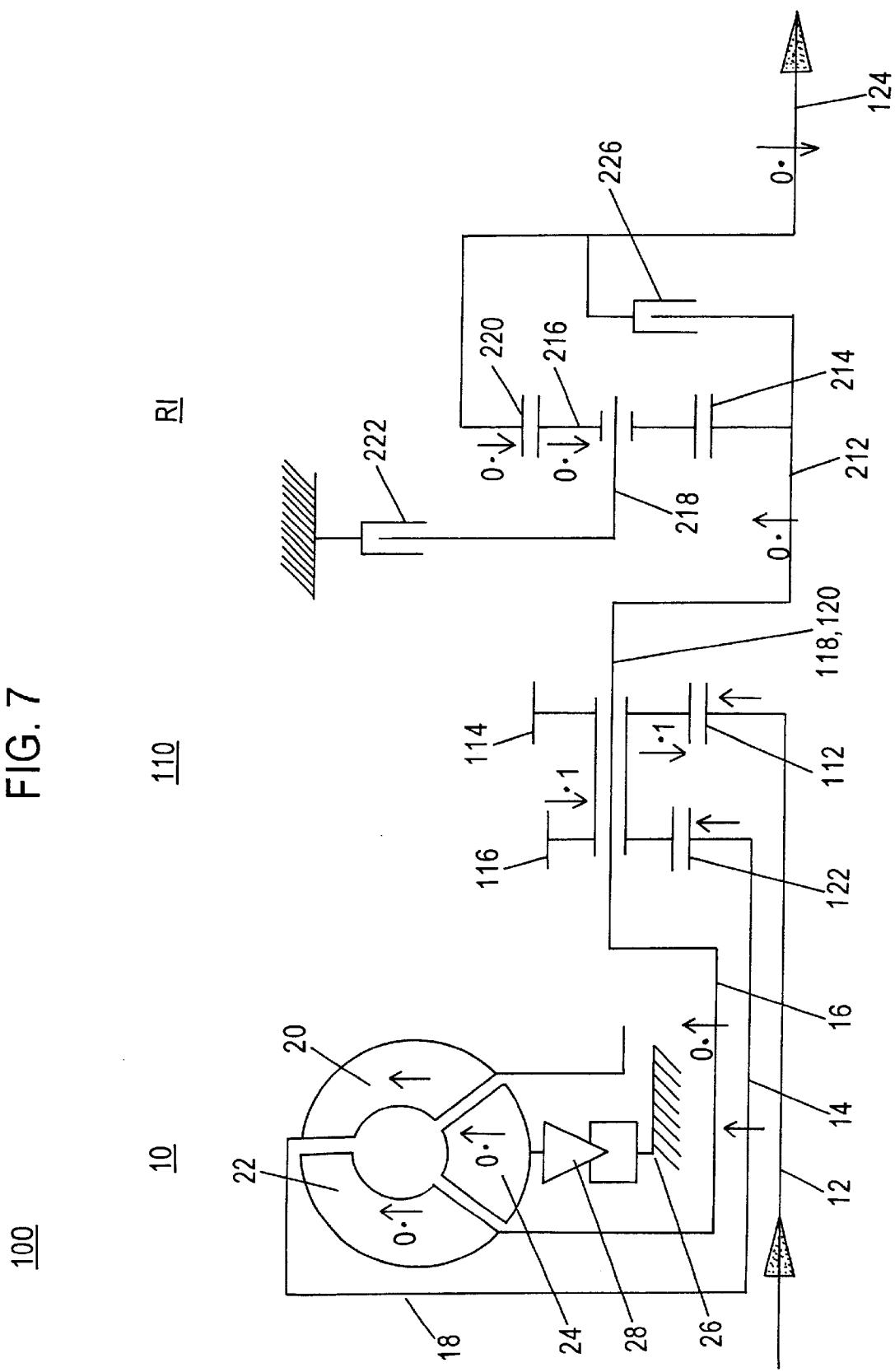

III. Reverse Rotation State (FIG. 7~FIG. 10)
1. Reverse Rotation I State (FIG. 7)

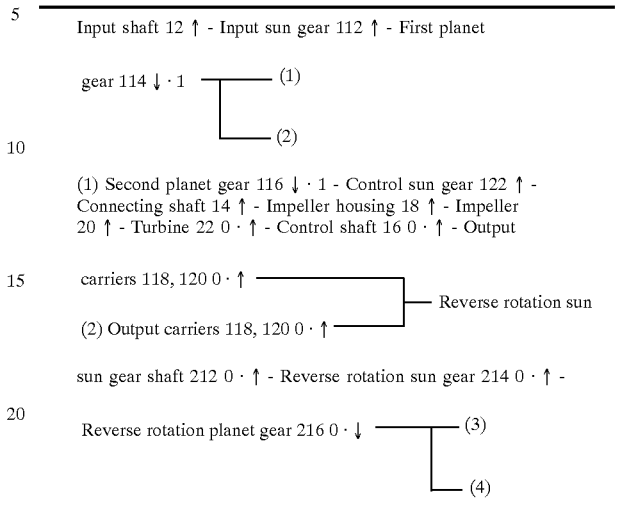

(3) Reverse Rotation Carrier 218 Stopped (By Actuation of Reverse Rotation Brake)
(4) Reverse Rotation Ring Gear 220 0·↓—Output shaft 124 0·↓

In the reverse rotation I state, the direct clutch 226 is released, and the reverse rotation brake 222 installed on the reverse rotation carriers 218 is actuated.

If the power of the engine is inputted to the input shaft 12, the input sun gear 112, integrally formed with the input shaft 12, is rotated in direction A, the same as that of the input shaft 12. Since the output carriers 118, 120, the reverse rotation sun gear shaft 212, integrally connected with the output carriers 118, 120, and the reverse rotation sun gear 214, integral with the reverse rotation sun gear shaft 212, are in a momentary stationary condition together with the output shaft 124 by actuation of the reverse rotation brake 222, the first planet gear 114 meshed with the input sun gear 112 is rotated in direction B opposite to that of the input sun gear 112 and decelerate and rotate the control sun gear 122 in direction A through the second planet gear 116. Also, the connecting shaft 14, integrally connected with the control sun gear 122, the impeller housing 18, integrally formed with the connecting shaft 14, and the impeller 20, integral with the impeller housing 18, are decelerated and rotated in direction A.

Here, reviewing the procedure of stepless speed changing, the reverse rotation carrier 218 and the reverse rotation ring gear 220, integrally connected to the output shaft 124, are in a stationary condition due to the actuation of the reverse rotation brake 222, installed at the outside of the reverse rotation carriers 218, and in addition, the reverse rotation sun gear shaft 212, integral with the reverse rotation sun gear 214, the output carriers 118, 120 integrally connected with the reverse rotation sun gear shaft 212, and the control shaft 16 and turbine 22 connected to the output carriers 118, 120 by the direct clutch 226, are also in a momentary stationary condition. In this state, a part of the rotational force transmitted to the first planet gear 114 through the input sun gear 112 is transmitted to the control sun gear 122 through the second planet gear 116, and also is transmitted to the impeller 20 through the connecting shaft 14, integrally formed with the control sun gear 122 and the impeller housing 18. At this time, since the turbine 22 is stopped, a rotational difference occurs between the impeller 20 and turbine 22.

In view of characteristics of the torque converter, the larger the rotational difference between the impeller 20 and turbine 22 is, the larger the rotational force becomes, and the increased rotational force of the impeller 20 is transmitted to the turbine 22, and therefore, the rotational force transmitted to the turbine 22 is transmitted to the reverse rotation sun gear shaft 212 and reverse rotation sun gear 214 through the control shaft 16 and output carriers 118, 120 integrally connected to the control shaft, and if the resistance acting on the reverse rotation sun gear 214 by the load of the output shaft 124 establishes equilibrium with the rotational force transmitted to the turbine 22, the reverse rotation sun gear 214 is driven. The rotational force is transmitted to the reverse rotation planet gear 216, meshed with the reverse rotation sun gear 214, upon rotation of the reverse rotation sun gear 214, and since the reverse rotation carrier 218 is stopped by actuation of the reverse rotation brake 222, the reverse rotation planet gear 216 rotates in direction B which is opposite to direction A and rotates the reverse rotation ring gear 220, meshed with the outside of the reverse rotation planet gear 216, in direction B. This is the reverse rotation starting state.

If the rotation of the engine is increased, the rotational difference between the impeller 20 and the turbine 22 becomes large, and therefore the rotational force transmitted to the turbine 22 is increased, and where the rotational force transmitted to the turbine 22 is larger than the resistance acting on the turbine 22 through the reverse rotation sun gear 214 due to the load of the output shaft 124, the reverse rotation sun gear 214 is accelerated until the rotational force of the turbine 22 transmitted from the impeller 20 establishes equilibrium with the resistance acting on the turbine 22, and the rotation of the reverse rotation ring gear 220, integral with the output shaft 124, is increased in direction B through the reverse rotation planet gear 216.

If the rotation of the output shaft 124 is increased, since the load of the output shaft 124 is decreased, the resistance acting on the turbine 22 through the reverse rotation sun gear 214 is also decreased. If the resistance acting on the turbine 22 is decreased, the rotational difference between the impeller 20 and the turbine 22 is decreased until the rotational force establishes equilibrium with the resistance. Therefore, the rotation of the turbine 22 is increased in direction A, the same as that of the impeller 20, and also, the rotation of the control shaft 16, integrally connected with the turbine 22 and the output carriers 118, 120 integrally connected to the control shaft 16 is increased in direction A. If the rotation of the output carriers 118, 120 is increased, also the rotation of the reverse rotation sun gear shaft 212, integrally connected to the output carriers 118, 120, and the reverse rotation sun gear 214 is increased, and the rotation of the reverse rotation ring gear 220 and the output shaft 124 is also increased through the reverse rotation planet gear 216.

As described above, the operational characteristics of the reverse rotation I state according to the present reverse rotation system RI (the same as in the other reverse rotation systems) is that the stepless reverse driving can be achieved according to the load of the output shaft 124 even at the time of reverse rotation.

Reviewing the rotational force transmitted to the output shaft 124 in the present reverse rotation system RI, the rotational force increased more than that of the input shaft 12 by the first planet gear 114 and the second planet gear 116, is transmitted to the control sun gear 122, which acts on the impeller 20 through the connecting shaft 14, and the rotational force is further increased by the impeller 20 which acts on the turbine 22, also is transmitted to the reverse rotation sun gear 214 through the control shaft 16, integrally connected to the turbine 22, and through the output carriers 118, 120 integrally connected to the control shaft and the reverse rotation sun gear shaft 212, and drives the reverse rotation ring gear 220 integral with the output shaft 124 through the reverse rotation planet gear 216, and therefore, the large rotational force drives the output shaft 124 at the time of reverse rotation, so that the acceleration and efficiency are improved and smooth and quiet running can be achieved even during reverse operation.

Figure 8:
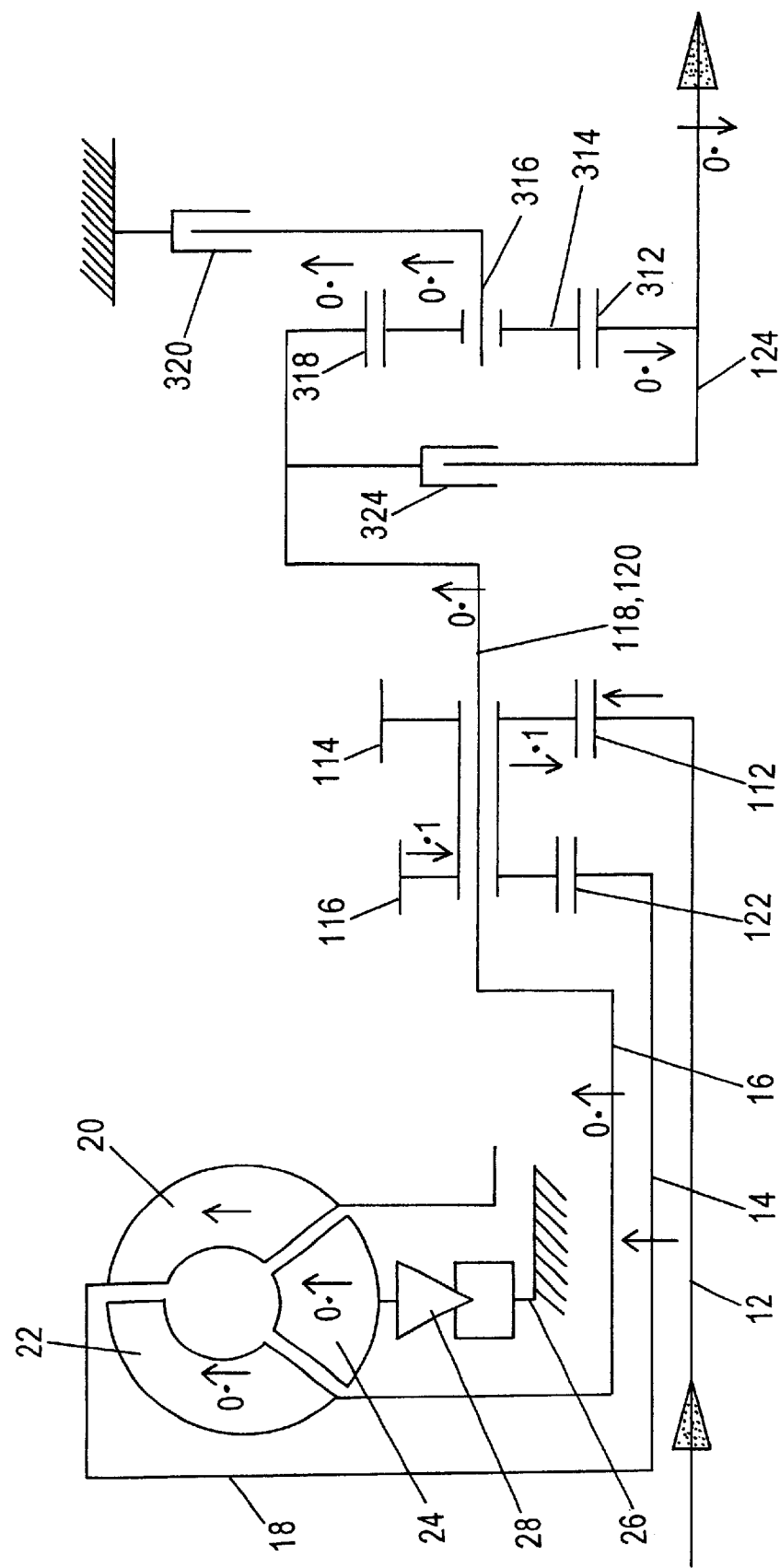

2. Reverse Rotation II State (FIG. 8)

Input shaft 12 ↑ - Input sun gear 112 ↑ - First planet

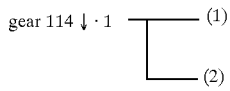

(1) Second planet gear 116 ↓ · 1 - Control sun gear 122 ↑ - Connecting shaft 14 ↑ - Impeller housing 18 ↑ - Impeller 20 ↑ - Turbine 22 0 · ↑ - Control shaft 16 0 · ↑ -

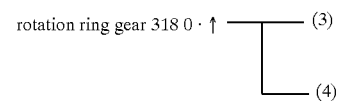

rotation ring gear 318 0 · ↑ ──────── (3)

──────── (4)

(3) Reverse Rotation Carrier 316 : Stopped (By Actuation of Reverse Rotation Brake)

(4) Reverse Rotation Planet Gear 314 0 ·↑—Reverse Rotation Sun Gear 312 0 ·↓—Output Shaft 124 0 ·↓

In the reverse rotation II state, the direct clutch 324 is released, and the reverse rotation brake 320 installed on the reverse rotation carrier 316 is actuated.

Since the rotational direction and the power transmission procedure in the present reverse rotation II state at the speed change system 110 and speed change controlling system 10 is same as in the reverse rotation I state based on the above described reverse rotation system RI, a description thereof is omitted, and here, only the procedure of transmitting the power to the output shaft 124 through the reverse rotation system RII is described.

As shown in FIG. 8, the reverse rotation ring gear 318 integrally connected to the output carriers 118, 120 is rotated in direction A, the same as that of the output carriers 118, 120, by the rotation of the output carriers 118, 120 of the speed change system 110. Since the reverse rotation carrier 316 is stopped by the actuation of the reverse rotation brake 320, the reverse rotation planet gear 314, meshed with the inside of the reverse rotation ring gear 318, is rotated in direction A, the same as that of the reverse rotation ring gear 318, and rotates the reverse rotation sun gear 312, meshed with the inside of the reverse rotation planet gear 314, in direction B opposite to direction A. Also, the output shaft 124, integrally connected to the reverse rotation sun gear 312, is rotated in direction B by the rotation of the reverse rotation sun gear 312.

Figure 9:
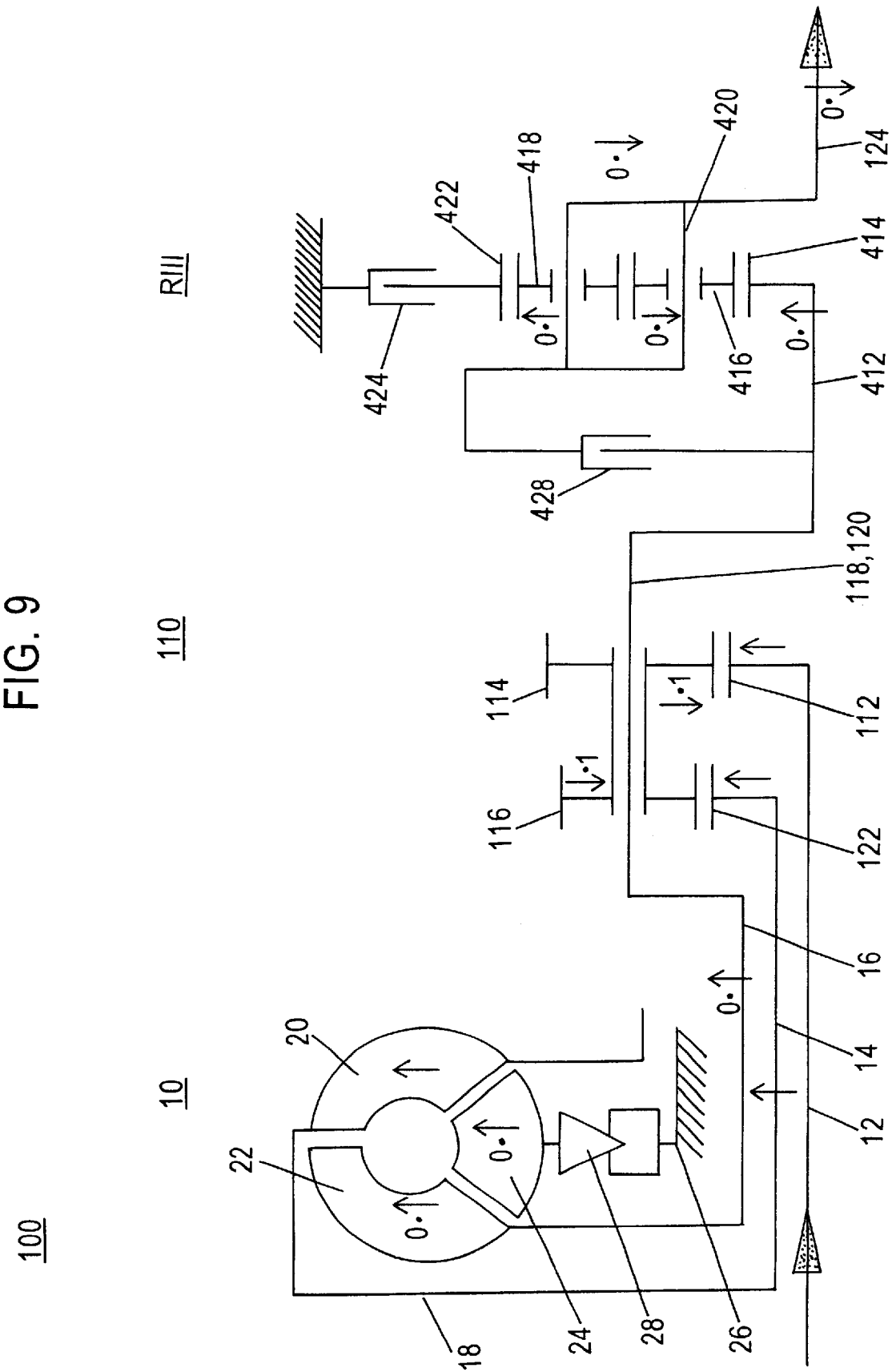

3. Reverse Rotation III State (FIG. 9)

Input shaft 12 ↑ - Input sun gear 112 ↑ - First planet gear

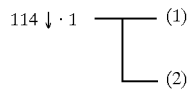

(1) Second planet gear 116 ↓ · 1 - Control sun gear 122 ↑ - Connecting shaft 14 ↑ - Impeller housing 18 ↑ - Impeller 20 ↑ - Turbine 22 0 · ↑ - Control shaft 16 0 · ↑ - Output

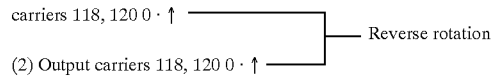

sun gear shaft 412 0 · ↑ - Reverse rotation planet gear

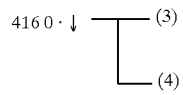

(3) Reverse Rotation Planet Gear 418 0 ·↑—Reverse Rotation Ring Gear 422 : Stopped (By Actuation Of Reverse Rotation Brake)

(4) Reverse Rotation Carrier 420 0 ·↓—Output Shaft 124 0 ·↓

In the reverse rotation system III state, the direct clutch 428 is released, and the reverse rotation brake 424, installed on the reverse rotation ring gear 422, is actuated.

Since the rotational direction and the power transmission procedure in the present reverse rotation III state at the speed change system 110 and the speed change controlling system 10 are the same as in the reverse rotation I state, based on the operation of the above described reverse rotation system RI, a description thereof is omitted, and here, only the procedure of transmitting the power to the output shaft 124 through the reverse rotation system RII is described.

As shown in FIG. 9, the reverse rotation sun gear shaft 412, integrally connected to output carriers 118, 120, is rotated in direction A, the same as that of the output carriers 118, 120, by the rotation of the output carriers 118, 120 of the speed change system 110, and also the reverse rotation sun gear 414, integrally connected to the reverse rotation sun gear shaft 412, is rotated in direction A. The reverse rotation sun gear 414 rotates the reverse rotation planet gear 416, meshed with the reverse rotation sun gear 414, in the opposite direction B, and the reverse rotation planet gear 416 rotates another reverse rotation planet gear 418 adjacent to and meshed with the reverse rotation planet gear 416 in direction A. Although the reverse rotation planet gear 418 intends to rotate the reverse rotation ring gear 422, meshed with the outside of the reverse rotation planet gear 418, since the reverse rotation ring gear 422 is stopped due to the actuation of the reverse rotation brake 424, the reverse rotation planet gear 418 rotates the reverse rotation carrier 420 in direction B. Also, the output shaft 124 integrally connected to the reverse rotation carrier 420 rotates in direction B.

Figure 10:
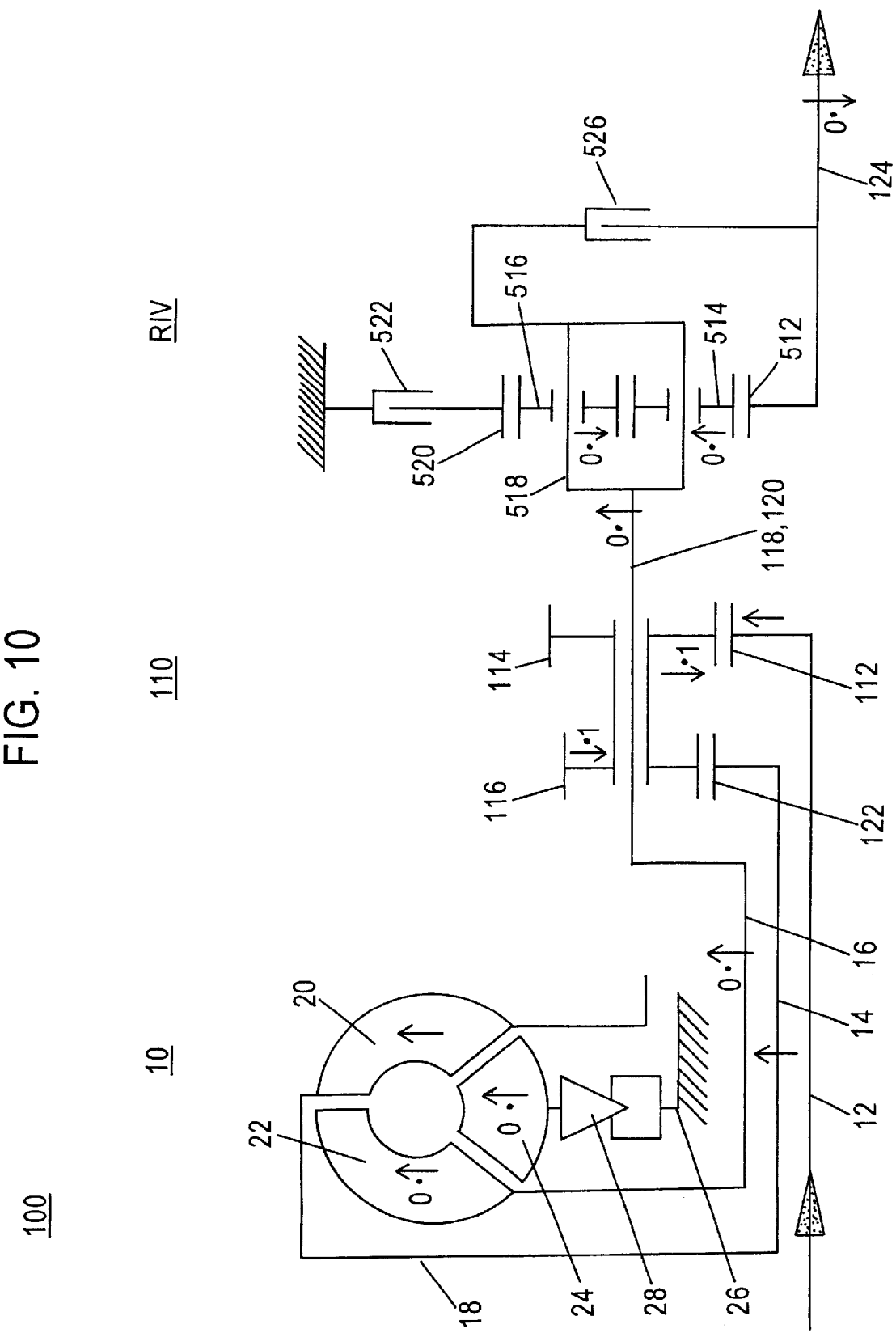

4. Reverse Rotation IV State (FIG. 10)

Input shaft 12 ↑ - Input sun gear 112 ↑ - First planet gear

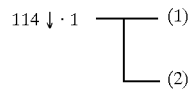

(1) Second planet gear 116 ↓ · 1 - Control sun gear 122 ↑ - Connecting shaft 14 ↑ - Impeller housing 18 ↑ - Impeller 20 ↑ - Turbine 22 0 · ↑ - Control shaft 16 0 · ↑ - Output

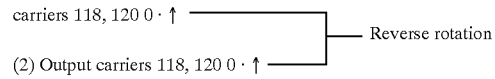

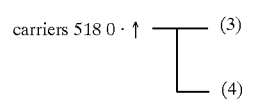

(3) Reverse Rotation Planet Gear 516 0 ·↓—Reverse Rotation Ring Gear 520 : Stopped (By Actuation Of Reverse Rotation Brake)

(4) Reverse Rotation Planet Gear 514 0 ·↑—Reverse Rotation Sun Gear 512 0 —Output Shaft 124 0 ·↓

In the reverse rotation IV state, the direct clutch 526 is released, and the reverse rotation brake 522 installed on the reverse rotation ring gear 520 is actuated.

Since the rotational direction and the procedure of power transmission in the present reverse rotation IV state at the speed change system 110 and speed change controlling system 10 are the same as in the reverse rotation I state based on the operation of the above described reverse rotation system RI, a description thereof is omitted, and here, only the procedure of transmitting the power to the output shaft 124 through the reverse rotation system RIV is described.

As shown in FIG. 10, the reverse rotation carrier 518 integrally connected to the output carriers 118, 120 is rotated in direction A, the same as that of the output carriers 118, 120, by rotation of the output carriers 118, 120 of the speed change system 110. The rotation is transmitted to the reverse rotation planet gears 514, 516 as the reverse rotation carrier 518 rotates, and since the reverse rotation ring gear 520, meshed with the outside of the reverse rotation planet gear 516, is stopped by the actuation of the reverse rotation brake 522, the reverse rotation planet gear 516 is rotated in the opposite direction B and rotates the reverse rotation planet gear 514, meshed in adjacent therewith, in direction A. The reverse rotation sun gear 512, meshed with the inside of the reverse rotation planet gear 514, rotates in the opposite direction B and rotates the output shaft 124 integrally connected thereto in the same direction B.

From now on, the 2nd embodiment through the 12th embodiment of the present invention are described. In the 2nd embodiment through the 12th embodiment of the present invention, since the installation structure and operation method of the speed change controling system is same as that of the speed change controlling system of the first embodiment, a description of the construction and operation method of the speed change controlling system is omitted, and although there is a difference in the construction of the speed change system too, the principle of the operation method or the speed change procedure is similar to that of the first embodiment, and therefore, a detailed description thereof is omitted. Similarly, also the installation construction of the reverse rotation system is same as that of the first embodiment, and the method of operation and speed change procedure are similar to that of the first embodiment, therefore, the detailed description thereof is omitted.

In addition, although the positions of the impeller I and turbine T can be changed in the speed change controlling system, since the operation method and power transmission procedure at the time of the speed change in the speed change controlling system is same as that of the first embodiment of the present invention, a description thereof is also omitted.

Therefore, in consideration of the similarity of the construction, method of operation and the speed change procedure, as described above, the construction of each embodiment is shown schematically for simplification and convenience of explanation.

That is, the schematic drawings of the 2nd embodiment through the 12th embodiment are shown in FIG. 11 through FIG. 21, the construction to which the reverse rotation system RI is combined is shown.

Although the speed change system basically utilizes the compound planet gear unit, there are differences in the method of input, the method of connecting the gear set to the impeller and turbine, and the method of combining the constituting elements. However, since the method of operation and the procedure of speed change are same as those of the first embodiment, each embodiment of the speed change system is shown in a table with a concurrent presentation of the corresponding figure.

TABLE

Figure 11:
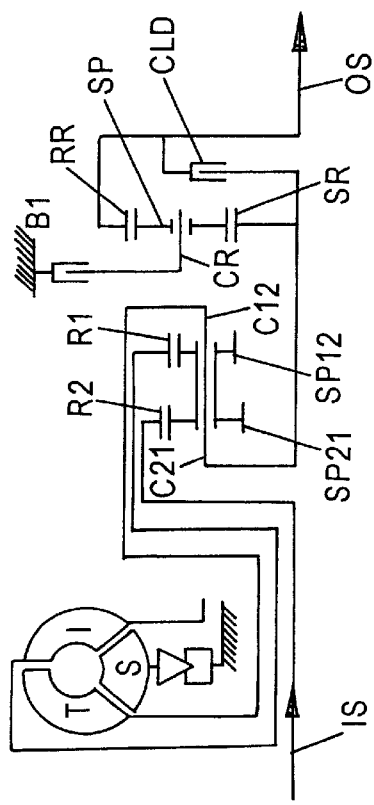
FIG. 11 to FIG. 21 are schematic drawings of a 2nd embodiment to a 12th embodiment of the continuously variable transmission of the present invention.
Figure 12:
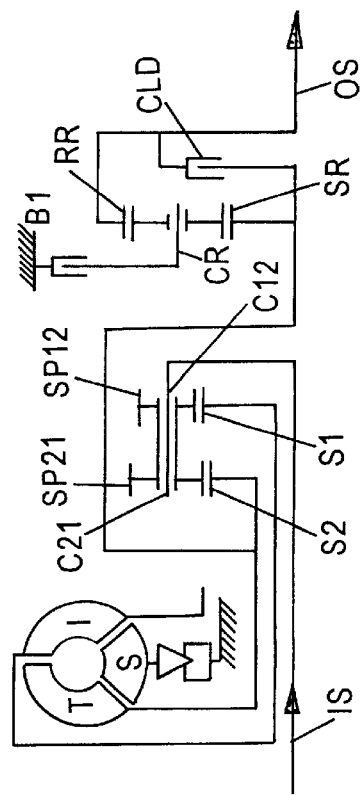
Figure 13:
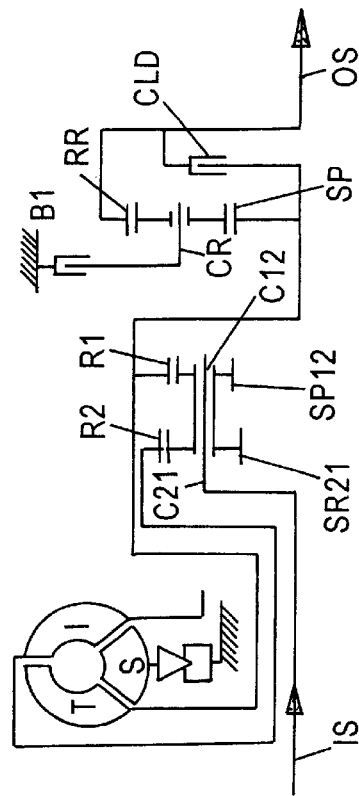
Figure 14E:
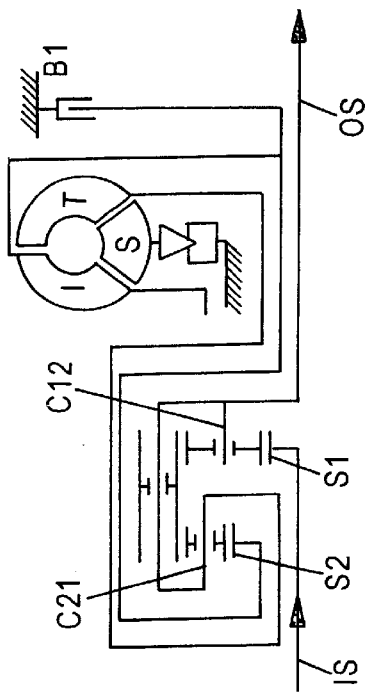
Figure 14G:
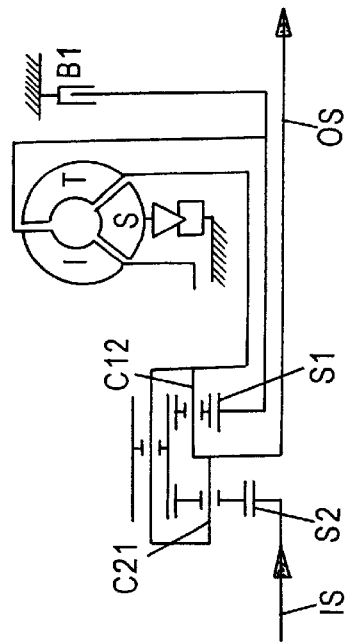
Figure 14D:
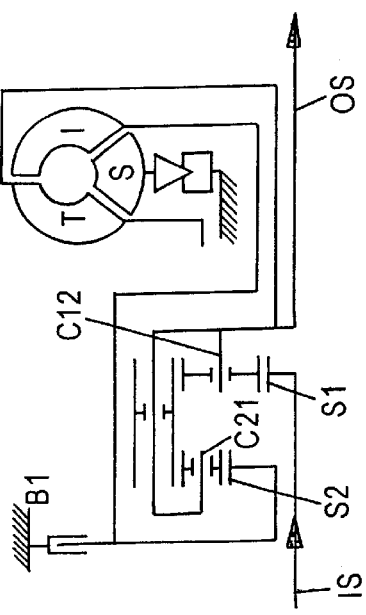
Figure 14F:
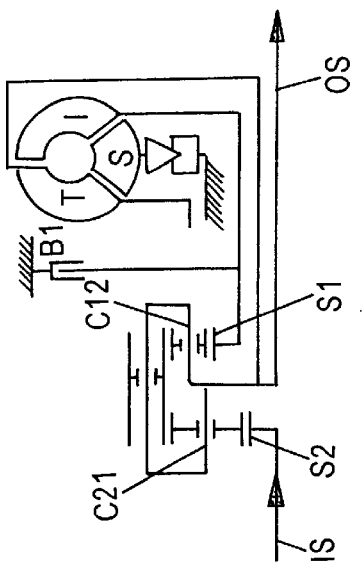
Figure 15:
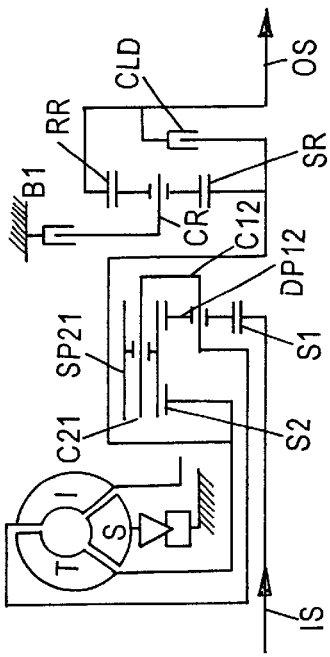
Figure 16:
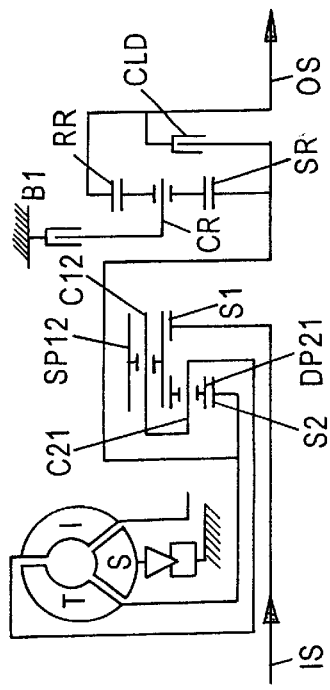
Figure 17:
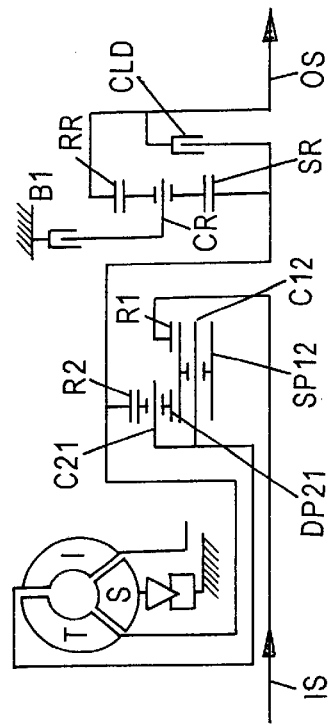
Figure 18:
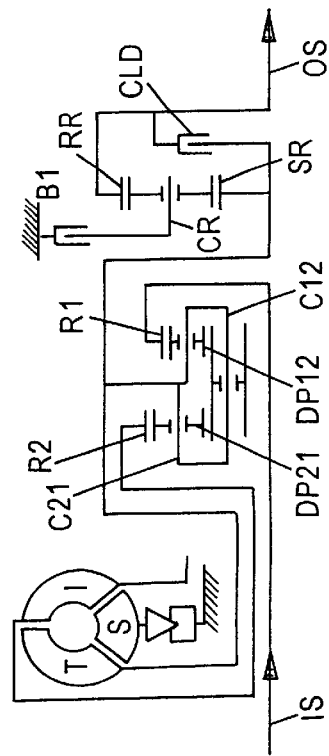
Figure 21:
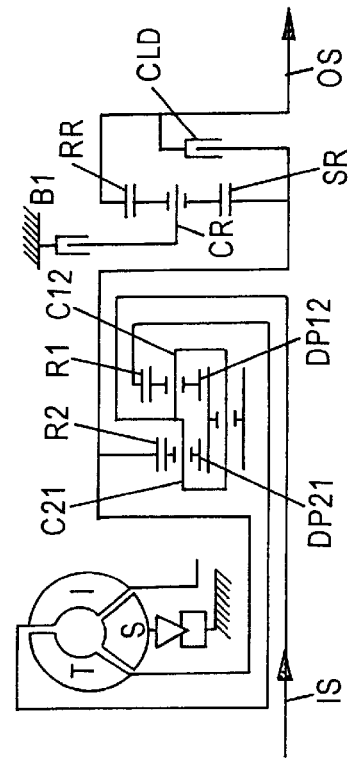
Figure 19:
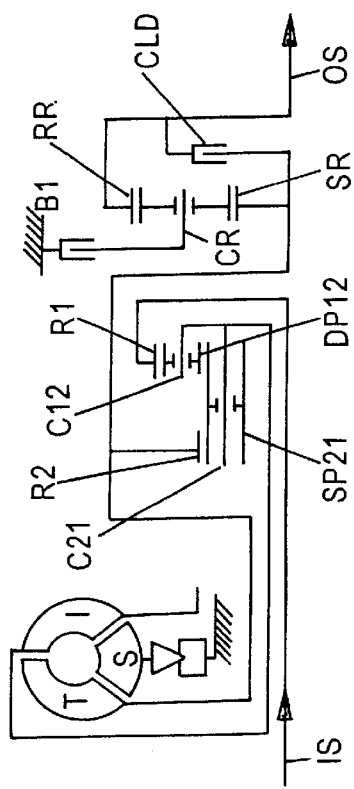
Figure 20:
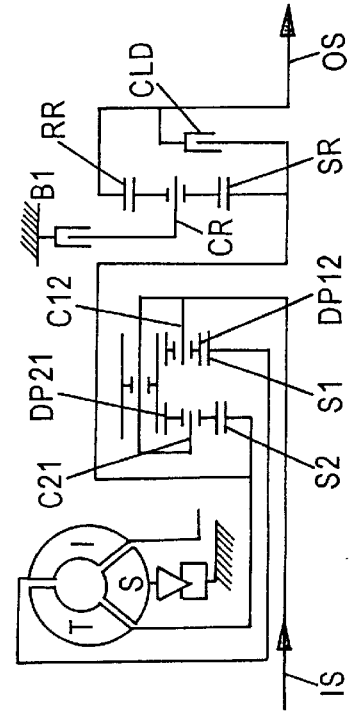

| Embodiment | Corresponding figure | Planet gear type | | | Connection with impeller I | Connection with turbine T and output drive |
|---|---|---|---|---|---|---|
| | | C21 side | C12 side | input | | |
| 1 | FIG. 1 | SP21 | SP12 | S1 | S2 | C12(C21) |
| 2 | FIG. 11 | SP21 | SP12 | R2 | R1 | C12(C21) |
| 3 | FIG. 12 | SP21 | SP12 | C12(C21) | S1 | S2 |
| 4 | FIG. 13 | SP21 | SP12 | C12(C21) | R2 | R1 |
| 5 | FIG. 14 | DP21 | DP12 | S1 | S2 | C12(C21) |
| 6 | FIG. 15 | DP21 | SP12 | SI | C12(C21) | S2 |
| 7 | FIG. 16 | SP21 | DP12 | S1 | C12(C21) | S2 |
| 8 | FIG. 17 | DP21 | DP12 | R1 | R2 | C12(C21) |
| 9 | FIG. 18 | DP21 | SP12 | R1 | C12(C21) | R2 |
| 10 | FIG. 19 | SP21 | DP12 | R1 | C12(C21) | R2 |
| 11 | FIG. 20 | DP21 | DP12 | C12(C21) | S1 | S2 |
| 12 | FIG. 21 | DP21 | DP12 | C12(C21) | R1 | R2 |

For reference, the symbol presentation of the main elements used in the table and figures is described below.
I: impeller
T: turbine
B1: reverse rotation brake
S: stator
CLD: direct clutch
DP: a set of dual planet gears
DP12: a first set of dual planet gears
DP21: a second set of dual planet gears
SP: a set of single planet gears
SP12: a frst set of single planet gears
SP21: a second set of single planet gears
S1: first sun gear
S2: second sun gear
C1: first carrier
C2: second carrier
C12, C21: planet carrier
R1: first ring gear
R2: second ring gear
$S_R$: reverse rotation sun gear
$C_R$: reverse rotation planet carrier
$R_R$: reverse rotation ring gear Here, the order of the suffix numbers 1 and 2 of same elements on the two sets of gears is determined as follows, that is, the first (or right) one is numbered as 1 and the second (or left) one is numbered as 2. Two digits (12 or 21) for the suffix number mean an integrated type, that is, mean that the elements are integrally connected each other. Here, 12 indicates the right portion, and 21 indicates the left portion. The planet gear unit used in the reverse rotation system RI through RIV comprises a single planet gear unit or a dual planet gear unit. The single planet gear unit includes a reverse rotation sun gear $S_R$, a set of single planet gears SP, a reverse rotation planet carrier $C_R$ and a reverse rotation ring gear $R_R$. Also, the dual planet gear unit includes a reverse rotation sun gear $S_R$, a set of dual planet gears DP, a reverse rotation planet carrier $C_R$ and a reverse rotation ring gear $R_R$.

Each reference unmber in the first embodiment corresponds as follows.

| | |
|---|---|
| 12 → IS | 124 → OS |
| 20 → I | 22 → T |
| 24 → S | 112 → S1 |
| 114 → SP12 | 116 → SP21 |
| 118, 120 → C12, C21 | 122 → S2 |
| 222, 320, 424, 522 → B1 | 226, 324, 428, 526 → CLD |
| 214, 312, 414, 512 → $S_R$ | 216, 314 → SP |
| 416, 418, 514, 516 → DP | 218, 316, 420, 518 → $C_R$ |
| 220, 318, 422, 520 → $R_R$ | |

In the present invention, various embodiments can be realized by providing the sun gear, the carrier supporting the planet gear and the ring gear and by appropriate combination between each element, proper selection of input element and method of establishing the gear ratio, and also the connection to the turbine, impeller, and reverse rotation brake can be varied, therefore, the scope of the present invention is not limited to the embodiments shown as examples.

For example, the 5th embodiment (such construction is represented as (T)(I)–(A) is shown in FIG. 14 and here, the desired purpose can be achieved with the construction in which the lateral arrangement of (T) and (I) is reversed, that is, the construction of (I)(T)–(A), and the example thereof is shown in FIG. 14A.

Furthermore, even if the input element is changed considering the symmetry of the input element, the desired purpose can also be achieved. That is, the example of the construction of (T)(I)–(B) in which the input element is changed considering the symmetry in 5th embodiment is shown in FIG. 14B, and here, the desired purpose can be achieved with the construction in which the lateral arrangement of (T) and (I) is reversed, that is, the construction of (I)(T)–(B) and an example thereof are shown in FIG. 14C.

For reference, if the reverse rotation system which is installed on the power line connected to the impeller instead of the reverse rotation system (RI~RIV) is provided (the reverse rotation driving is performed at a fixed ratio when operating), (T) and (I) can be located at the side of the output shaft and the example of such construction of (A)–(T)(I) is shown in FIG. 14D. Here, the example of the construction in which the lateral arrangement of (T) and (I) is reversed, that is, the construction of (A)–(I)(T) is shown in FIG. 14E.

In the construction in which the input element is changed considering the symmetry of the input element, if the reverse rotation system in which is installed on the power line connected to the impeller is provided, (T) and (I) can be located at the side of the output shaft and the example of such construction of (B)–(T)(I) is shown in FIG. 14F, and here, the example of the construction in which the lateral arrangement of (T) and (I) is reversed, that is, the construction of (B)–(I)(T) is shown in FIG. 14G.

As described above, in the present invention, on the basis of the embodiment shown as an example, not only the input element can be changed, but also the connection of the turbine and impeller, can be changed if desired, and of course, the operation varies according to the characteristics of each embodiment. Although each of such probable examples is not specifically described in the present specification, such probable examples naturally fall within the scope of the present invention in view of the tenor of the present invention.

Although the gear ratio between the first and second planet gear, and the gear ratio between the sun gear and ring gear are not described in the claims, since the embodiments of the present invention can be fully understood in view of the operation principle of the present invention or with reference to the drawings if required, it is natural that the omission of the description of the gear ratio does not limit the scope of the present invention.

It is obvious that the continuously variable transmission of the present invention is not limited to the present embodiments but can be applied to all apparatuses which can speed-change the driving force and output it to the output shaft in all vehicles and industrial machines based on the tenor of the present invention, and that various modification and alteration can be made in the scope of the present invention.

As described above, the continuously variable transmission of the present invention can respond quickly to a change in load and transmit the rotational force smoothly under the state in which all the gear are engaged, in addition, can change the speed steplessly at forward rotation and reverse rotation by simple construction, reduce manufacturing cost, and provide an improved durability.

What is claimed is:

1. A continuously variable transmission comprising:
   an input shaft for delivering power to the transmission;
   an output shaft for delivering power from the transmission;
   a compound planet gear unit including
     (i) a first sun gear driven by said input shaft IS;
     (ii) a first set of single planet gears meshed with said first sun gear;
     (iii) a second set of single planet gears rotatably secured to said first set of single planet gears;
     (iv) a second sun gear meshed with said second set of single planet gears; and
     (v) a planet carrier for rotatably supporting said first and second sets of planet gears;
   an impeller drivingly connected to said second sun gear;
   a turbine drivingly connected to said planet carrier C12, C21; and
   a stator positioned between said impeller and said turbine by means of a one-way clutch.

2. A continuously variable transmission comprising:
   an input shaft for delivering power to the transmission;
   an output shaft for delivering power from the transmission;
   a compound planet gear unit including
     (i) a first ring gear;
     (ii) a first set of single planet gears meshed with said first ring gear;
     (iii) a second set of single planet gears rotatably secured to said first set of single planet gears;
     (iv) a second ring gear meshed with said second set of single planet gears and driven by said input shaft; and
     (v) a planet carrier for rotatably supporting said first and second sets of planet gears;
   an impeller drivingly connected to said first ring gear;
   a turbine drivingly connected to said planet carrier; and
   a stator positioned between said impeller and said turbine by means of a one-way clutch.

3. A continuously variable transmission comprising:
   an input shaft IS for delivering power to the transmission;
   an output shaft for delivering power from the transmission;
   a compound planet gear unit including
     (i) a first sun gear;
     (ii) a first set of single planet gears meshed with said first sun gear;

(iii) a second set of single planet gears rotatably secured to said first set of single planet gears;
(iv) a second sun gear meshed with said second set of single planet gears; and
(v) a planet carrier for rotatably supporting said first and second sets of planet gears SP12, SP21 and driven by said input shaft;

an impeller drivingly connected to said first sun gear;
a turbine drivingly connected to said second sun gear; and
a stator positioned between said impeller and said turbine by means of a one-way clutch.

4. A continuously variable transmission comprising:
an input shaft for delivering power to the transmission;
an output shaft for delivering power from the transmission;
a compound planet gear unit including
  (i) a first ring gear;
  (ii) a first set of single planet gears meshed with said first ring gear;
  (iii) a second set of single planet gears rotatably secured to said first set of planet gears;
  (iv) a second ring gear meshed with said second set of single planet gears; and
  (v) a planet carrier C12, C21 for rotatably supporting said first and second sets of planet gears and driven by said input shaft;
an impeller drivingly connected to said second ring gear;
a turbine drivingly connected to said first ring gear; and
a stator positioned between said impeller and said turbine by means of a one-way clutch.

5. A continuously variable transmission comprising:
an input shaft for delivering power to the transmission;
an output shaft for delivering power from the transmission;
a compound planet gear unit including
  (i) a first sun gear driven by said input shaft;
  (ii) a first set of dual planet gears meshed with said first sun gear;
  (iii) a second set of dual planet gears rotatably secured to said first set of dual planet gears;
  (iv) a second sun gear meshed with said second set of dual planet gears; and
  (v) a planet carrier for rotatably supporting said first and second sets of planet gears;
an impeller drivingly connected to said second sun gear;
a turbine drivingly connected to said planet carrier C12; and
a stator positioned between said impeller and said turbine by means of a one-way clutch.

6. A continuously variable transmission comprising:
an input shaft for delivering power to the transmission;
an output shaft for delivering power from the transmission;
a compound planet gear unit including
  (i) a first sun gear driven by said input shaft;
  (ii) a first set of single planet gears meshed with said first sun gear;
  (iii) a second set of dual planet gears rotatably secured to said first set of single planet gears;
  (iv) a second sun gear meshed with said second set of dual planet gears; and
  (v) a planet carrier for rotatably supporting said first and second sets of planet gears SP12, DP21;
an impeller drivingly connected to said planet carrier C12, C21;
a turbine drivingly connected to said second sun gear; and
a stator positioned between said impeller and said turbine by means of a one-way clutch.

7. A continuously variable transmission comprising:
an input shaft for delivering power to the transmission;
an output shaft for delivering power from the transmission;
a compound planet gear unit including
  (i) a first sun gear driven by said input shaft;
  (ii) a first set of dual planet gears meshed with said first sun gear;
  (iii) a second set of single planet gears rotatably secured to said first set of dual planet gears;
  (iv) a second sun gear meshed with said second set of single planet gears; and
  (v) a planet carrier for rotatably supporting said first and second sets of planet gears;
an impeller drivingly connected to said planet carrier;
a turbine drivingly connected to said second sun gear; and
a stator positioned between said impeller and said turbine by means of a one-way clutch.

8. A continuously variable transmission comprising:
an input shaft for delivering power to the transmission;
an output shaft for delivering power from the transmission;
a compound planet gear unit including
  (i) a first ring gear driven by said input shaft;
  (ii) a first set of dual planet gears meshed with said first ring gear;
  (iii) a second set of dual planet gears rotatably secured to said first set of dual planet gears;
  (iv) a second ring gear meshed with said second set of dual planet gears; and
  (v) a planet carrier for rotatably supporting said first and second sets of planet gears;
an impeller drivingly connected to said second ring gear;
a turbine drivingly connected to said planet carrier; and
a stator positioned between said impeller and said turbine by means of a one-way clutch.

9. A continuously variable transmission comprising:
an input shaft for delivering power to the transmission;
an output shaft for delivering power from the transmission;
a compound planet gear unit including
  (i) a first ring gear driven by said input shaft;
  (ii) a first set of single planet gears meshed with said first ring gear;
  (iii) a second set of dual planet gears rotatably secured to said first set of single planet gears;
  (iv) a second ring gear meshed with said second set of dual planet gears; and
  (v) a planet carrier for rotatably supporting said first and second sets of planet gears;
an impeller drivingly connected to said planet carrier;
a turbine drivingly connected to said ring gear; and
a stator positioned between said impeller and said turbine by means of a one-way clutch.

10. A continuously variable transmission comprising:
an input shaft for delivering power to the transmission;
an output shaft for delivering power from the transmission;
a compound planet gear unit including (i) a first ring gear driven by said input shaft;
(ii) a first set of dual planet gears meshed with said first ring gear;
(iii) a second set of single planet gears rotatably secured to said first set of dual planet gears;
(iv) a second ring gear meshed with said second set of single planet gears; and
(v) a planet carrier for rotatably supporting said first and second sets of planet gears;

an impeller drivingly connected to said planet carrier;
a turbine drivingly connected to said second ring gear; and
a stator positioned between said impeller and said turbine by means of a one-way clutch.

11. A continuously variable transmission comprising:
an input shaft for delivering power to the transmission;
an output shaft for delivering power from the transmission;
a compound planet gear unit including
(i) a first sun gear;
(ii) a first set of dual planet gears meshed with said first sun gear;
(iii) a second set of dual planet gears rotatably secured to said first set of dual planet gears;
(iv) a second sun gear meshed with said second set of dual planet gears; and
(v) a planet carrier for rotatably supporting said first and second sets of planet gears and driven by said input shaft;

an impeller drivingly connected to said first sun gear;
a turbine drivingly connected to said second sun gear; and
a stator positioned between said impeller and said turbine by means of a one-way clutch.

12. A continuously variable transmission comprising:
an input shaft for delivering power to the transmission;
an output shaft for delivering power from the transmission;
a compound planet gear unit including
(i) a first ring gear;
(ii) a first set of dual planet gears meshed with said first ring gear;
(iii) a second set of dual planet gears rotatably secured to said first set of dual planet gears;
(iv) a second ring gear meshed with said second set of dual planet gears; and
(v) a planet carrier for rotatably supporting said first and second sets of planet gears and driven by said input shaft;

an impeller drivingly connected to said first ring gear;
a turbine drivingly connected to said second ring gear; and
a stator positioned between said impeller and said turbine by means of a one-way clutch.

13. The continuously variable transmission according to claim 1 further comprising:
a single planet gear unit for selectively establishing a reverse drive, including
(i) a reverse rotation sun gear drivingly connected to the output drive of said compound planet gear unit;
(ii) a set of single planet gears meshed with said reverse rotation sun gear;
(iii) a reverse rotation planet carrier for rotatably supporting said set of single planet gears;
(iv) a reverse rotation ring gear meshed with said set of single planet gears and operatively connected to said output shaft;

a reverse rotation brake for selectively engaging said planet carrier for reversing driving; and
a direct clutch for selectively engaging the output drive of said compound planet gear unit to said output shaft for forward driving.

14. The continuously variable transmission according to claim 1 further comprising:
a single planet gear unit for selectively establishing a reverse drive, including
(i) a reverse rotation sun gear drivingly connected to said output shaft;
(ii) a set of single planet gears meshed with said reverse rotation sun gear;
(iii) a reverse rotation planet carrier rotatably supporting said set of single planet gears;
(iv) a reverse rotation ring gear drivingly connected to the output drive of said compound planet gear unit and meshed with said set of single planet gears;

a reverse rotation brake for selectively engaging said planet carrier for reverse driving; and
a direct clutch for selectively engaging the output drive of said compound planet gear unit to said output shaft for forward driving.

15. The continuously variable transmission according to claim 1 further comprising:
a dual planet gear unit for selectively establishing a reverse drive, including
(i) a reverse rotation sun gear drivingly connected to the output drive of said compound planet gear unit;
(ii) a set of dual planet gears meshed with said reverse rotation sun gear;
(iii) a reverse rotation planet carrier for rotatably supporting said set of dual planet gears, with said reverse rotation planet carrier drivingly connected to said output shaft; and
(iv) a reverse rotation ring gear meshed with said set of dual planet gears;

a reverse rotation brake for selectively engaging said reverse rotation ring gear for reverse driving; and
a direct clutch for selectively engaging said reverse rotation planet carrier to the output drive of said compound planet gear unit for forward driving.

16. The continuously variable transmission according to claim 1 further comprising:
a dual planet gear unit for selectively establishing a reverse drive, including
(i) a reverse rotation sun gear drivingly connected to said output shaft;
(ii) a set of dual planet gears meshed with said reverse rotation sun gear;
(iii) a reverse rotation planet carrier for rotatably supporting said set of dual planet gears, with the reverse rotation planet carrier drivingly connected to the output drive of said compound planet gear unit; and
(iv) a reverse rotation ring gear meshed with said set of dual planet gears;

a reverse rotation brake for selectively engaging said reverse rotation ring gear for reverse driving; and
a direct clutch for selectively engaging said reverse rotation planet carrier to the output shaft for forward driving.

* * * * *